(12) United States Patent
Prystupa et al.

(10) Patent No.: US 11,401,114 B2
(45) Date of Patent: Aug. 2, 2022

(54) SINGULATING AND ORIENTING OBJECTS FOR FEEDING

(71) Applicant: 9754741 Canada Ltd., Winnipeg (CA)

(72) Inventors: David Prystupa, Pinawa (CA); John Pacak, Winnipeg (CA)

(73) Assignee: 9754741 Canada Ltd., Winnipeg (CA)

( * ) Notice: Subject to any disclaimer, the term of this patent is extended or adjusted under 35 U.S.C. 154(b) by 0 days.

(21) Appl. No.: 16/347,473

(22) PCT Filed: Apr. 15, 2019

(86) PCT No.: PCT/CA2019/050462
§ 371 (c)(1),
(2) Date: May 3, 2019

(87) PCT Pub. No.: WO2019/195946
PCT Pub. Date: Oct. 17, 2019

(65) Prior Publication Data
US 2021/0276814 A1 Sep. 9, 2021

Related U.S. Application Data

(60) Provisional application No. 62/657,068, filed on Apr. 13, 2018.

(51) Int. Cl.
*B65G 47/14* (2006.01)
*B23P 19/00* (2006.01)
*B65G 47/256* (2006.01)

(52) U.S. Cl.
CPC ........ *B65G 47/1464* (2013.01); *B23P 19/002* (2013.01); *B65G 47/256* (2013.01); *B65G 2203/0225* (2013.01)

(58) Field of Classification Search
CPC .. B65G 47/1464; B65G 47/256; B65G 47/24; B65G 47/244; B65G 47/22;
(Continued)

(56) References Cited

U.S. PATENT DOCUMENTS 2,682,973 A * 7/1954 Alfred ................ B65G 47/1457
221/68
3,831,734 A * 8/1974 Hoppmann ............ B65D 1/095
198/382
(Continued)

FOREIGN PATENT DOCUMENTS

WO WO 2018018155 2/2018

*Primary Examiner* — William R Harp
(74) *Attorney, Agent, or Firm* — Adrian D. Battison; Ade & Company Inc.; Ryan W. Dupuis

(57) ABSTRACT

Objects in a stream in a duct are singulated and oriented by rotating at least some so that the orientations of all aligned. In one arrangement a slot is provided in the singulation duct into which the shank falls while the head remains in the singulation duct. In another arrangement there is provided a buffering device and a transfer member for transferring the singulated oriented objects from the buffering device to an operating location. In another arrangement a first path changes the orientation of relative to the second path. The objects can be fed from a singulation duct to a supply duct having an exit mouth lying on a rotation axis of the singulation duct.

17 Claims, 17 Drawing Sheets

(58) Field of Classification Search
CPC .... B65G 47/1471; B65G 47/26; B65G 47/28;
B65G 47/1442; B65G 47/1457; B07B
13/10; B07B 13/11; B07B 13/16; B07C
5/02; B07C 5/34; B07C 5/36; B23P
19/002
See application file for complete search history.

(56) References Cited

U.S. PATENT DOCUMENTS

| | | |
|---|---|---|
| 3,912,120 A | 10/1975 | Hoppmann |
| 6,276,512 B1 * | 8/2001 | Geerke ................. B65G 47/256 |
| | | 198/395 |
| 7,030,338 B2 * | 4/2006 | Carruthers .............. A61J 3/005 |
| | | 219/121.7 |
| 7,128,204 B2 | 10/2006 | Baranowski |
| 7,861,846 B1 | 4/2011 | Salditch |
| 8,985,308 B2 | 3/2015 | Stoiber |
| 10,933,447 B2 * | 3/2021 | Prystupa ................. B07C 5/362 |

* cited by examiner

FIG. 8A
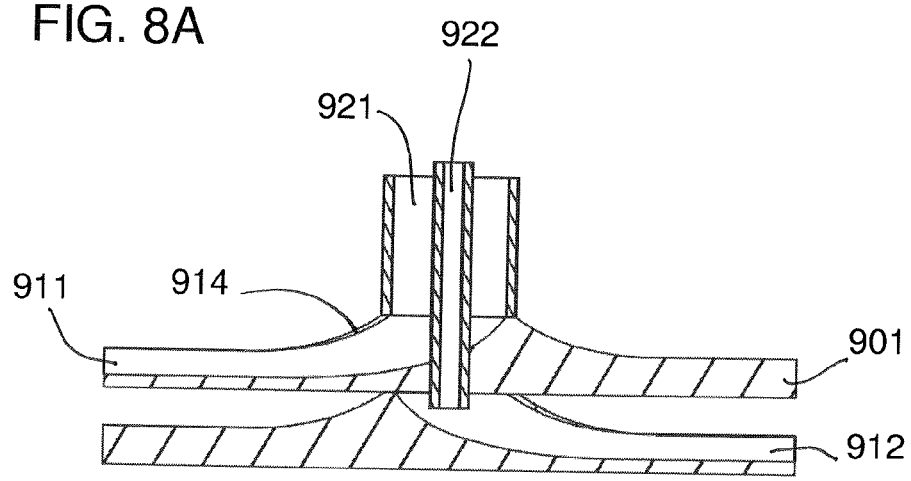
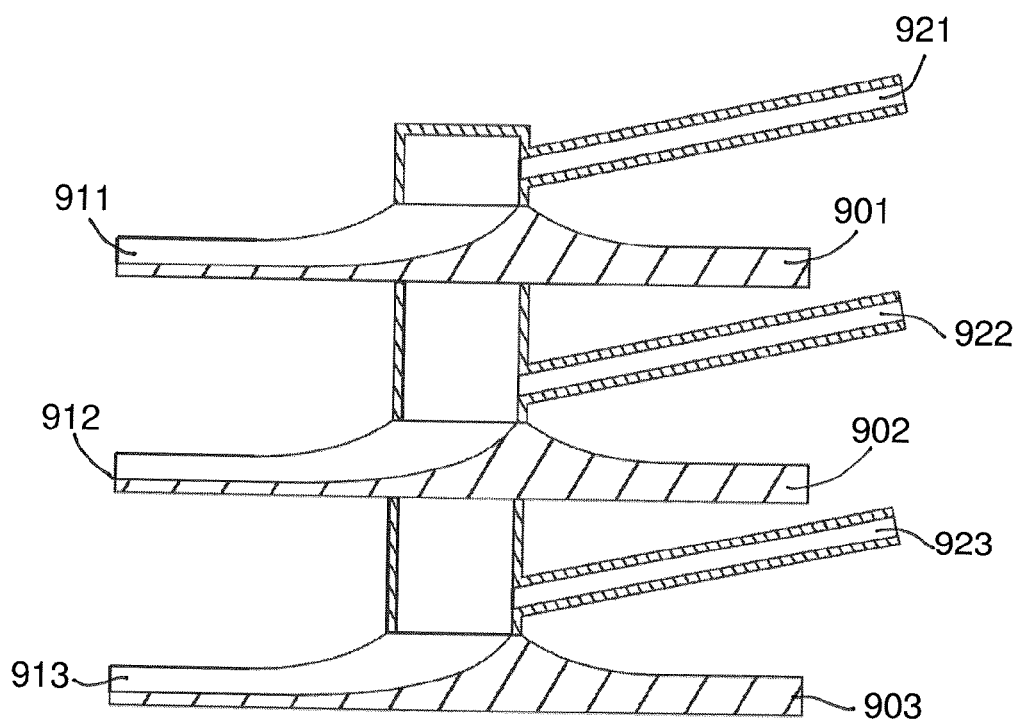
FIG. 8B

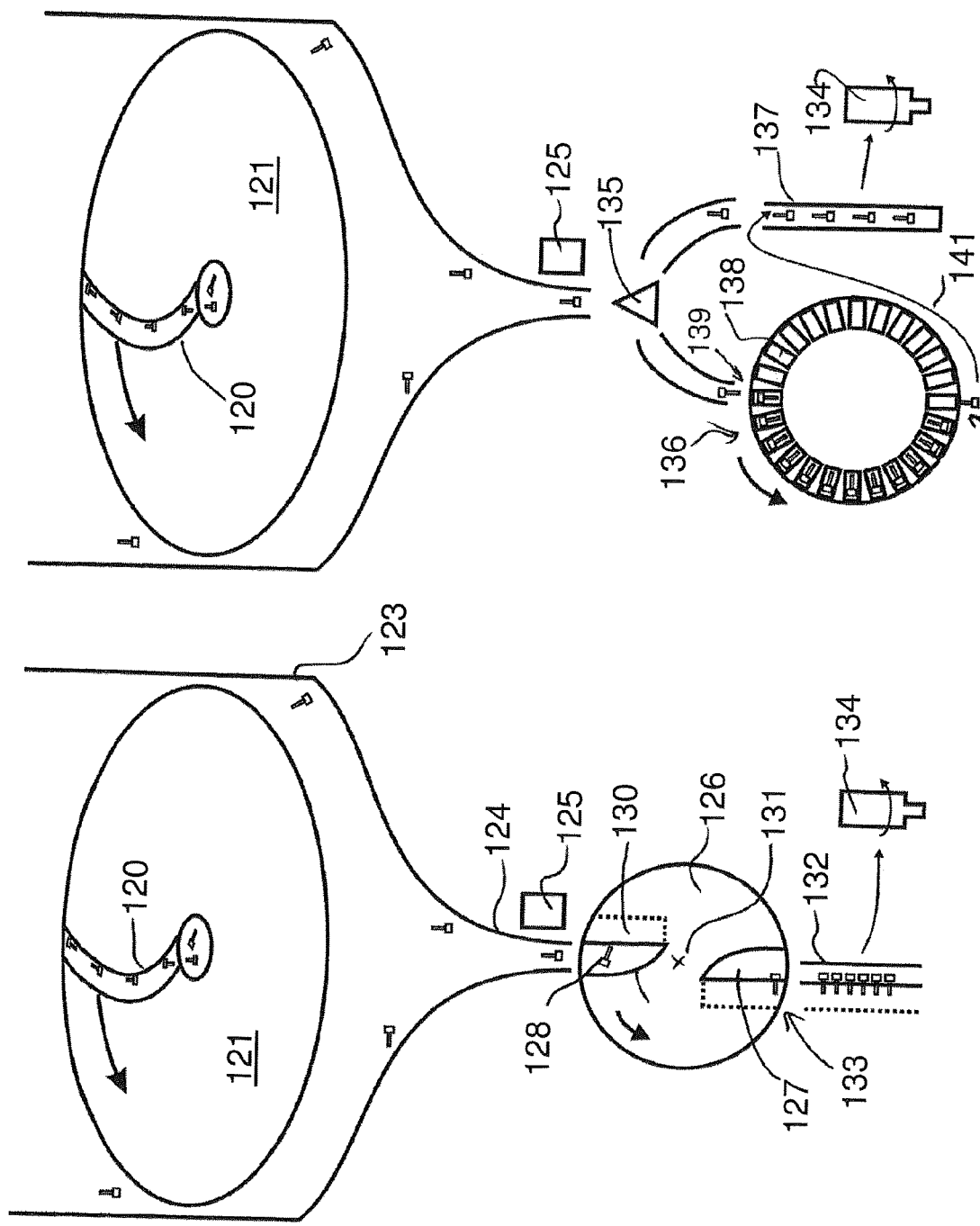

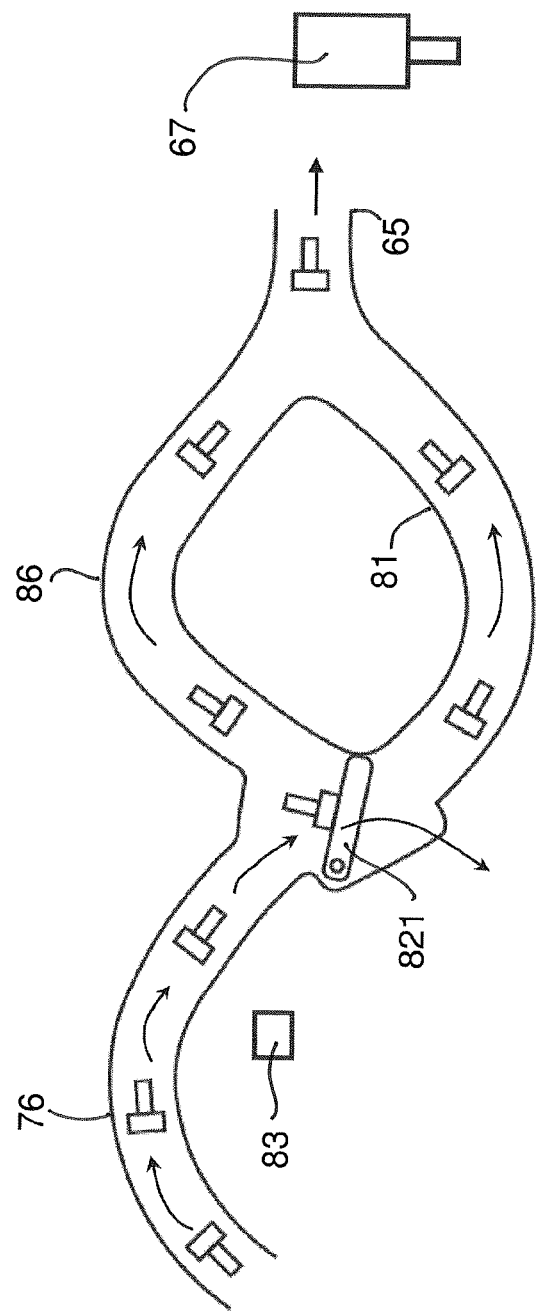

SINGULATING AND ORIENTING OBJECTS FOR FEEDING

The invention is a system for singulating, sorting and orienting objects and placing selected objects into an ordered array. The invention is primarily directed toward singulating and orienting objects for automated assembly. In an exemplary application, the object can be a fastener such as a screw fed into an automated screwdriver. Other types of objects may be used.

BACKGROUND OF THE INVENTION

Automated fastener machines are widely used in manufacturing to assemble products. Several methods are used in prior art to singulate and orient fasteners prior to transferring them to a device that places the fasteners in the parts to be assembled. Bowl feeders operate by vibrating a spiral ramp. The vibration supplies energy to a disordered collection of fasteners in a central reservoir causing the fasteners to reorient. The vibration frequency, typically from 60 Hz to 400 Hz, is tuned for resonance with the fastener to be singulated. Fasteners with a favorable orientation (long axis substantially aligned with the local ramp axis) are propelled along the spiral ramp and those with an unfavorable orientation fall into the central reservoir. In another variant, groups of fasteners are fed to a vibrating ramp with a step feeder. In another variant, fasteners are fed onto an intermittently vibrating plate with orienting features. After a period of vibration, the orientation of fasteners is detected by machine vision and those fasteners with a favorable orientation are extracted with an automated picker. These devices produce significant acoustic noise that must be muffled. The prior art methods described above are capable of supplying only a few parts per second. A primary object of the invention is to increase the number of parts per second that can be supplied to an automated fastening device to increase the manufacturing rate. Another objective of the invention is to reduce the size of the singulation apparatus. Another objective of the invention is to reduce the cost of the singulation apparatus. Another objective of the invention is to reduce the noise of the singulation apparatus.

SUMMARY OF THE INVENTION

The invention is a system for singulating, sorting and orienting objects and placing selected objects into an ordered array. In the context of the invention the term object refers to any item that requires orientation relative to a substrate or another object. Objects termed "antiparallel" to another object means that the "antiparallel object is oriented at 180 degrees relative to the reference object. The term ordered array has the meaning that there is a constant average displacement between the centers of mass of objects in the array. The orientation of an object can be specified by a set of orientation vectors related to at least one spatially varying property of the object. For convenience, the center of mass of the object is taken as the origin for orientation vectors in the following discussion. Different properties may have different sets of related orientation vectors. While orientation is often specified by the shape of the object, it may also be specified by an internal property of the object unrelated to shape such as a change in material properties or the route of an electrical circuit. The term orientation herein generally refers to a set of one or more selected orientation vectors. The selected set may contain orientation vectors related to different object properties. For example, one orientation vector may specify the direction of a surface normal and another orientation vector may specify the direction from the center of mass to an electrical contact. The term orientation axis is used interchangeably with the term orientation vector herein. In an important set of embodiments, the orientation vector corresponds to a longitudinal axis of the object. The term longitudinal axis is used throughout for illustrative purposes and is not to be interpreted as limiting the invention to orientation of a longitudinal axis only. Within the spirit and intent of the invention, the term longitudinal axis has the same meaning as selected orientation axis. An object can, for example be a molded plastic base that is to be bonded with circuit on a silicon substrate. An object can be a fastener such as a screw or rivet that is used to join two or more parts of a manufactured item together. An object can be a tulip bulb that requires orientation prior to placement in a soil substrate.

According to a first aspect of the invention there is provided a method for feeding objects in a stream from a massed supply of the objects where each object has an orientation axis and is shaped so that the object has first and second different orientations of the orientation axis, the method comprising:

supplying the massed supply of the objects;

transferring the objects from the supply into a singulation duct;

forming the objects into a stream of the objects which are singulated each from the next by passing the objects along the singulation duct and rotating the singulation duct about a rotation axis such that centrifugal forces generated by the rotation act to drive the objects along the singulation duct and to cause pressure on the objects against a wall of the singulation duct to slide along the wall:

and orienting the objects in the stream by engaging the objects in the stream and rotating at least some of the objects so that all the objects at a location in the stream after the orientation have the orientations thereof aligned.

The orientation axis is typically longitudinal of the body concerned but this is not necessarily so as objects of other shapes can be oriented by the methods herein.

Preferably the method includes rotating the longitudinal axis of at least some of the objects about a transverse axis so that all the objects at a location in the stream after the orientation have the longitudinal axes and the orientations thereof aligned.

That is the orientation requires more than simply aligning the objects along their orientation axis which occurs during movement along the duct but in addition another component is provided which acts on the objects so aligned to rotate the orientation axis. In this way the objects such as screws or other fasteners can be arranged with the head leading or the head trailing or the axis of the screw transverse to the direction of movement in the stream.

In accordance with another important aspect of the invention there is provided an object buffering device and a transfer member for transferring the singulated oriented objects from the object buffering device to the operating tool.

In accordance with another aspect of the invention an action to the oriented objects is provided so that the action takes place on each object in the same orientation.

Where the definitions herein refer to a path or duct, it will be appreciated that the rotating body may include a only one singulation duct or may carry a plurality of ducts all operating on the same objects to increase productivity or operating on different types of objects such as different size of fasteners.

In accordance with another aspect of the invention there is provided a sensor for detecting the orientation of the objects in the stream, wherein the objects are directed along first and second paths depending on the detection of the first and second orientations and wherein the first path is arranged to change the orientation of the objects therein relative to the second path so that the objects are combined into a common stream from the first and second paths in the same orientation.

In one example, the first path is arranged to feed the objects into the common stream in a first direction and the second path is arranged to feed the objects into the common stream in a second direction opposite to the first direction. This acts to reverse the orientation of the objects in the second path relative to the first path to ensure that all objects in the common stream have the same orientation.

In another example the second path includes a component for reversing the orientation of the objects therein. This can be a twist for reversing the orientation of the objects therein. This can be a movable component operable to carry the objects into a reversed orientation for reversing the orientation of the objects therein.

In one arrangement, the orienting of the objects is carried out while the objects are in the singulation duct.

That is the orienting can be effected by an abutment structure which engages the objects while in the singulation duct and acts to rotate object or the orientation axis of the object about the transverse axis.

In one example, the orienting acts to rotate the objects so that the longitudinal axis of all is transverse to a direction of movement along the singulation duct. This is particularly effective for fasteners where the fasteners are then supplied in a magazine or buffer moving toward the tool such as a screw driver with the axis of the screw's transverse to the direction of movement.

In one example the objects have a head and a shank and the longitudinal axis is longitudinal of the shank. However, the arrangements described herein can be used with other shapes and constructions of objects which require particular orientations. Preferably the screws or fasteners are arranged such that the heads and the shanks are aligned at right angles to the direction of movement. However, the orientation may be used to present the fasteners with the tip at one end and at the head at the other along the movement direction.

For example, the orientation can be effected in a duct by providing a slot in the singulation duct into which the shank falls while the head remains running along in the singulation duct. In this way the slot acts to orient the object with the longitudinal axis transverse to the singulation duct.

In another arrangement, the orienting is located beyond an end of the singulation duct so that the duct acts only to singulate and the orientation is carried out while the objects remain in the singulated stream but downstream of the duct.

In one example the objects are oriented by capture as they are released from the singulation duct into an orienting member.

In another example, there is provided a sensor for detecting the orientation of the objects in the stream and the objects are operated upon to change the orientation thereof depending on the detected orientation.

This can be done in another example where the objects are directed along first and second paths depending on the detection of the first and second orientations. In this arrangement, preferably the first path is arranged to change the orientation of the objects therein relative to the second path so that the objects are combined into a common stream from the first and second paths in the same orientation.

In one particular end use of the singulation and orientation system described above, the objects are transferred from the singulation duct to a buffer container in which the objects are halted to form a feed supply of the objects. This is particularly required where the objects are fed to an operating tool as a supply thereof. In one example of a device which operates in this manner, the buffer container rotates with the singulation duct and is subsequently halted to download the objects. That is the buffer collects the objects while the buffer and singulation duct are commonly rotating and then the buffer is halted in a downloading operation. In this example preferably there is provided at least two buffer containers where a first is loaded from the singulation duct while the second is halted.

Where the objects are fed to a tool for using the objects one after another, in one example the objects are fed directly from the buffer container to the tool. However, in another arrangement, the objects are not fed directly but instead are inserted into an elongated storage member or magazine which forms a feed to the tool. This can be for example a strip of material such as paper on which the objects are carried in a row or a tube of material such as plastic in which the objects are carried end-to-end in a row.

In addition to orientation, in another example there is provided a sensor for detecting characteristics of the objects in the stream where some of the objects can be discarded or displaced depending on the characteristics detected. For example, the system can be used to assess the quality or viability of the objects such as screws and to discard from use those which are not suitable. However, many other uses of the sensing or measuring system can be used in many other ways.

Where the objects such as screws have a tendency to become intertangled, there is preferably provided a supply duct for transferring the objects from the massed supply to the singulation duct where the supply duct is agitated to ensure the objects enter the singulation duct.

In another construction, the objects are fed from the singulation duct to a supply duct which rotates with the singulation duct and carries the objects when singulated and oriented to an exit mouth lying on the axis of rotation of the singulation duct. In this way the objects emerge from the mouth in a stream with the same orientation. This is particularly effective for feeding the singulated, oriented moving objects along the axis into the axis of an insertion tool In some cases, the measurement device which detects one or more parameters of the objects may only detect the presence of the objects. In other cases, the presence and one or more characteristics of the detected object may also be obtained.

In accordance with an important optional feature of the invention which can be used independently with any of the above or following features, there is provided an object measuring device for detecting at least one parameter of the singulated objects.

In accordance with an important optional feature of the invention which can be used independently with any of the above or following features, there is provided a control system for recording measurements of the objects relative to time.

In accordance with an important optional feature of the invention which can be used independently with any of the above or following features, there is provided a control system for recording measurements of the objects relative to location in the object buffering device.

In accordance with an important optional feature of the invention which can be used independently with any of the above or following features, there is provided a diverting device for diverting selected objects away from the object buffering device in response to the detecting of at least one parameter of the singulated objects.

In accordance with an important optional feature of the invention which can be used independently with any of the above or following features, the singulation rate is higher than a minimum required rate so that a replacement object is available in instances where a first tested object does not meet a condition to continue to the transfer device and is discarded.

In accordance with an important optional feature of the invention which can be used independently with any of the above or following features, the storage container includes at least first and second separate containers containing respective objects with first and second quality parameters and a control device is used which selects the container.

In accordance with an important optional feature of the invention which can be used independently with any of the above or following features, a transfer device which carries the objects from the exit of the duct to the end use location which comprises a belt with receptacles for the objects.

In accordance with an important optional feature of the invention which can be used independently with any of the above or following features, the transfer device is arranged such that the angular velocity of an object exiting the transfer device is approximately zero.

In accordance with an important optional feature of the invention which can be used independently with any of the above or following features, the transfer device comprises a funnel and a slot that is operable with an actuator to move between a catch position and a release position. In this arrangement, in some cases there may be provided sensors to detect the presence and/or velocity of the objects. Another important feature may provide a sensor which detects whether and when the object actually reaches the object buffering device to ensure accuracy of the object feeding action and to halt operation in the event of a blockage or other inconsistent operation.

In accordance with an important feature of the invention which can be used independently with any of the above or following features, a packaging means is supplied to enclose objects singulated and oriented.

In accordance with an important optional feature of the invention which can be used independently with any of the above or fallowing features, the object feeding system includes a system for supplying a surface coat to each or some of the objects such as a lubricant oil or an adhesive.

In accordance with an important optional feature of the invention which can be used independently with any of the above or following features, there is provided a rotary body mounted for rotation around an axis with the rotary body defining at least one duct extending from an inner end adjacent the axis outwardly to an outer end spaced at a greater radial distance outwardly from the axis than the inner end, wherein the massed objects are fed at the inner end of said at least one duct, the inner end being arranged in an array adjacent the axis so that the supply conduit acts to deposit the objects at the inner end of said at least one duct for entry of the objects into the inner low velocity end and for separation of the stream of objects in the conduit into separate ones of said at least one duct, said at least one duct being shaped and arranged so that the objects are accelerated as they pass from the inner end to the outer end so as to cause the objects separated into said at least one duct to be aligned one after another in a row in the duct as they move toward the outer end.

In accordance with another important feature of the invention which can be used independently with any of the above or following features, there is provided an agitation means to agitate objects fed from the supply conduit so as to cause said objects to flow without binding. Agitation means can be in the supply conduit, on the rotating body, or both. The agitation means can, for example be a vibrator. The agitation means can be far example an array of paddles made to rotate relative to the supply conduit or rotary body. The agitation means can be protrusions on the inner wall of the supply conduit.

In accordance with another important feature of the invention which can be used independently with any of the above or following features, there is provided a plurality of supply conduits that convey different types of objects to the rotating body wherein each supply conduit reeds a set of one or more ducts distinct from the set of one or more ducts supplied by any other supply conduit. The inner ends of each set of ducts are preferably displaced axially relative to any other set of ducts. The apparatus can be used, for example to supply different types of objects to a further process in the ratio needed by adjusting the number of ducts dedicated to each type and the rate of passage in the supply conduit for each type of object.

In accordance with another important feature of the invention which can be used independently with any of the above or following features, there is provided a computing means that receives information about at least one parameter of a rotating body and associated supply conduits, ducts, detectors, diverters, and object buffers.

In accordance with another important feature of the invention which can be used independently with any of the above or following features, the computing means produces a summary report to an operator based on the information received.

In accordance with another important feature of the invention which can be used independently with any of the above or following features, the computing means is capable of changing at least one operating parameter based at least in part on information received.

In accordance with another important feature of the invention which can be used independently with any of the above or following features, the computing means receives information from a plurality of rotating body apparatus and changes at least one operating parameter based on the information received to effect a change such that the collective action of plurality of rotating body apparatus produce an output of objects to meet an operator specified parameter.

One objective of the current invention is to increase the rate at which objects can be presented to an assembly apparatus so that a finished part can be manufactured faster. A further objective of the invention is to provide information about quality characteristics of each object together with information about the time that it is transferred to an object buffer and its position within the object buffer.

In the most preferred embodiment, the singulation means is as described in published PCT application WO 2018/018155 by the present applicant published 1 Feb. 2018, the arrangement of which can be used herein.

The singulation system thus consists of a rotating body with one or more ducts running from a central region where bulk objects are introduced from the bulk object reservoir to an outer region where singulated objects are released. The objects are accelerated by inertial forces dependent on the angular speed of the rotating body and the shape of the ducts. The singulation rate achieved by a single duct in this apparatus is significantly higher than the singulation rate achieved by the bowl feeder in prior art allowing objects to be transferred to an object buffer at a significantly higher rate. An automated assembly station based on the present embodiment can assemble finished parts faster because the singulation step is not rate limiting. A singulation system of this type requires only a rotary motor which can be conveniently driven by electricity or by hydraulic power.

The singulation system described in published PCT application WO 2018/018155 emits objects at intervals determined in part by the distribution of center to center distances in the bulk objects. The average period and variance in the period depend on the size and shape distribution of the objects as well as surface texture, which modulates friction with duct walls. Each object orients in a duct so as to minimize potential energy. For all but spherical objects, the long axis of the object will preferentially align with the axis of the duct. The specification includes measurement of object properties either within a duct or after release as well as a means to redirect objects based on measured properties. The object buffer in the present invention functions to allow emission of objects from the object buffer at a constant rate. The maximum rate of emission from the object buffer is the average rate of arrival of objects into the object buffer.

In other embodiments, the object is collected by a funnel and deposited in a slot that is operable with an actuator to move between a catch position and a release position. The width of the slot is selected such that the slot can receive an object for a length of time corresponding to the variance in release times. After an object is caught, the actuator accelerates toward the release position and inertial forces drive the object against the training edge of the slot. The trailing edge is shaped to orient the object. For example, the trailing edge may itself have a slot wide enough to accept a screw body, but narrow enough to exclude the screw head.

In many cases the method includes carrying out an operation on the singulated objects while they remain singulated. That operation can include merely looking at or counting the singulated objects. However, the singulation is particularly effective for processing the singulated objects such as by coating with a lubricant or adhesive. In other cases, the operation can include carrying out analysis or assessment of the objects.

In some embodiments the object measurement means is an imaging system that provides information about the size, shape and reflectance of the object at one or more wavelengths.

In some embodiments the object measurement means is acoustic and provides information about variation in density within the object. The measurement could, for example detect a crack. The system could reject cracked objects to prevent possible failure in a finished assembly.

In some embodiments, a plurality of measurement means is used. In some embodiments, information about the object together with information about its location in the object buffer is stored.

In a preferred embodiment, the object feeding system has a diversion means operable to divert objects to different locations depending upon at least one measured quality parameter of each object. If a quality parameter meets an operator-determined threshold, the object continues to the object buffer, otherwise the object is diverted to a container. For example, if the object is a screw, a screw determined to be good continues to the object buffer and a screw determined to be defective is diverted to a reject bin. In this embodiment, it is desirable to operate the singulation means at a rate slightly higher than the rate the object buffer is emptied by an assembly tool so that a replacement object is available shortly thereafter if an object is diverted to the reject bin. In some embodiments, surplus objects that are otherwise suitable for use are diverted to a storage bin and re-introduced to the singulation means at a later time. This could occur, for example, if the object buffer is full.

In some embodiments, the object buffer is a packaging container that is replaced with another packaging container when a pre-determined number of objects have been placed in the container. In some cases, the packaging container receives only one object in a specified orientation. For example, the packaging container could be a tape strip with a series of compartments to hold electronic parts in a definite orientation.

In some embodiments, the object feeding system is associated with a plurality of bulk object reservoirs, each containing a different type of objects. The computation means selects which one object reservoir is connected with and feeds the singulation means at any time.

While the system can be effective for a single duct to generate a high-speed stream of singulated objects, in many cases there is provided a plurality of ducts arranged in an array around the center feed conduit. This arrangement can both increase the rate of object singulation and as described below allow multiple object types to be singulated simultaneously. Each object type has a corresponding feed conduit that delivers objects to an axial platform in communication with one or more ducts dedicated to that object type. The axial platforms for each object type are staggered along the rotation axis of the singulation system. For example, one duct could singulate #4-40 screws while another duct could singulate #6-32 screws.

The apparatus defined above can be used for detecting at (cast one measurable parameter of a stream of objects comprising:

carrying objects in a stream of objects in a supply conduit;
rotating a rotary body around an axis;
the rotary body defining at least one duct extending from an inner end adjacent the axis outwardly to an outer end spaced at a greater radial distance outwardly from the axis than the inner end;
the inner end being arranged adjacent to the axis so that the supply conduit acts to deposit the objects at the inner end of said at least one duct for entry of the objects into the inner end;
said at least one duct being shaped and arranged so that the objects are accelerated as they pass from the inner end to the outer end so as to cause the objects separated into the duct to be aligned one after another in a row in the duct as they move toward the outer end;
and for each of said at least one duct, measuring said at least one parameter of the objects.

In some cases, the apparatus is provided for sorting the objects so that, for each of the ducts, the objects are directed into one of a plurality of paths as determined by the measurement of the parameter. The measured parameter can be the orientation of each object. Objects of each orientation are directed into a different path. For example, a stream of screws will align parallel and antiparallel to a duct axis. Screws aligned parallel are directed to a different path than screws aligned antiparallel. In a preferred embodiment, the different paths are arranged to bring objects to a common alignment and subsequently merge into a single path. However, the measurement of the parameter or parameters, which is obtained more effectively in view of the increased degree of singulation of the objects using the arrangement herein, can be used for other purposes.

The arrangement defined above therefore can provide an advantage that the increased velocity obtained by rotation of the body together with the increased acceleration of the objects on the body better separates each object from the next for detection of the parameter. In addition, the increased velocity of the objects can be used to increase the throughput of the system as the detection or measurement of the parameter can be carried out more quickly.

In one arrangement the measurement of the parameters is carried out while the objects are in the duct. This has the advantage that the location of the objects is more clear and defined since it is controlled by the rotation of the body and the position of the duct. In view of the more accurate location of the object, the measurement of the parameter can in many cases be carried out more effectively.

In this case preferably the measurement of the parameter is carried out by a measurement device carried on the rotary body. In this way the measurement device is located at a specific position relative to the duct and relative therefore to the objects. This can simplify the operation of the measurement device since it can be focused more accurately on a specific location. In this case each duct may include one or more separate measurement devices dedicated to the measurement of the objects flowing through that duct. That is each object when moving along a duct can pass a number of sensors or measurement devices, which may be aligned in a row, where each detects a different parameter of the object to enable a better assessment of the object to be made. However, in some cases a single sensor can provide all of the required information.

Preferably, at least a portion of the duct proximate to the measurement devices is comprised of a transparent material. The provision of a portion of the duct as transparent allows the measurement to be carried out through the transparent section while the duct remains of a constant shape to continue to control movement of the object.

In one arrangement, the walls of the ducts or the ducts themselves are segmented with one or more gaps between segments. One or more measurement devices are located proximate to the gaps to measure different parameters of the object with a view unobstructed by the walls of the ducts. Where the duct itself is divided into separated segments, each segment is preferably arranged along the path of the duct substantially parallel to the average velocity vector of the objects at the location of said segment to minimize perturbation of object flow along the duct. The object can thus be operated upon using any of the techniques described herein while it is in the gap.

In another arrangement, the separation of the objects can be carried out using electrostatic forces where the objects are charged differentially according to selected parameters and then passed through an electric field so that the differential charging causes the objects to divert to different paths. Typically, an arrangement is provided which generates an equal charge on each object so that objects of different mass are separated by passing those objects through an electric field which acts differentially on the objects based on their different masses since each object has a different or unique charge per unit mass. This method could be used for example to direct objects containing an unwanted void to a reject bin.

Preferably the ducts are curved so that the outer end is angularly retarded relative to the inner end. This shape typically follows closely the path of the object as it is accelerated under centrifugal force and Coriolis force so that the object can travel along the path without excessive friction against the sides of the duct.

Preferably the ducts are arranged immediately side by side at the inner ends adjacent the axis so that the reed conduit deposits the objects in the manner which separates the objects directly into the inner ends of the ducts, with the ducts increasing in spacing toward the outer ends as the ducts move toward areas of increased diameter on the rotary body.

Preferably the axis of the rotary body is vertical so that the disk lies in a horizontal plane. However other orientations can be used.

Preferably a side wall of each duct against which the objects run is inclined in a direction along the axis so that acceleration forces on the objects act to move the objects into a common radial plane for release from the rotary body. That is the acceleration forces tend to move the objects axially of the rotary body toward a common axial position. In this way, even if the objects enter the ducts at positions spaced along the axis, the shape of the duct brings them all to the same axial location.

In one preferred arrangement, each duct is shaped such that the acceleration causes the object to move against a wall of the duct where the wall is V-shaped to confine the object to a base of the V-shape. The wall can include a surface which includes rifling for engaging and rotating the object in the duct. In addition, the wall can include one or more openings at a location such that components smaller than the objects are separated from the objects by release through openings. Each duct can include an associated second duct parallel to the duct into which the separated smaller components enter. This can be used in a system where there is a stack of such ducts so that the objects are separated by size from the first. In a related preferred arrangement, the openings in duct walls permit passage of only part of an object so as to cause the object to align relative to the duct wall. For example, a duct wall may contain a slot enabling the body of a screw to pass through but not the head. If the slot is deep enough, the screw axis becomes aligned perpendicular to the duct wall.

In one example each separating device comprises a separating head having a front edge arranged such that the objects to be separated move toward the front edge in a stream and an actuator for moving the front edge between a first position on one side of the stream arranged to direct the object to a second side of the stream, and a second position on a second side of the stream, arranged to direct the object to said one side of the stream.

In this example preferably the separating head is arranged in a radial plane of the rotating body and the first and second sides are arranged on respective sides of the radial plane.

In this example preferably the separating head includes inclined guide surfaces on the first and second sides of the front edge so that the separating head is generally wedge shaped. In other embodiments, the separating head may have three or more generally triangular faces with base sides forming of each triangle a polygon with wherein the normal to the polygon is (for the neutral position) 180 degrees from the direction of incident objects. The separating head need not come to a sharp point: that is the sides may be trapezoidal. In this arrangement the base of the separating head is a polygon and the point of the separating head is similar to the base polygon differing only in scale. For example, the separating head may be generally tetrahedral in shape for directing objects into three distinct paths. For example the separating head may be generally pyramidal in shape for directing objects into four distinct paths.

Preferably the actuator is moved by piezo electric members. However other drive forces can be used for example an electromagnetic voice coil.

Preferably the actuator is mounted in a tube which extends radially outward of the separating head and lies in a radial plane of the separating head.

The present invention is not limited to the typo or size of object concerned and may be operated with different particles or objects to be separated. The arrangement of the invention may be used for objects ranging in size from microns to meters. In the micron size range, the objects may be for example flakes such as quantum dots where the optical properties depend on the object dimensions and orientation. The object may be for example a crystal and the arrangement herein is used to orient a crystal face relative to an internal crystallographic plane. The crystal may for example be birefringent and the orienting operation of the present invention is used to align an optical axis for assembly in an optical system. The crystal may for example be silicon and the orienting operation of the present invention is used to present a particular crystallographic axis for further processing operations such as laser ablation, ion machining or etching. The object may for example be a MEMS device or a part of a MEMS device such as a micro mirror or a micro lens. The objects may be passive electronic components such as a resistors or capacitors that are singulated and oriented by the present invention for packaging or for placement on a carrier such as a printed circuit board. The objects may be active electronic components such as transistors, LED's, or integrated circuit chips that are singulated and oriented by the present invention for packaging or placement on a carrier. The objects may be fasteners such as buttons, clasps, screws, bolts, nails, rivets, nuts or washers. The objects may be electronic connectors that are singulated and oriented for installation on for example a panel assembly. The objects may be manufactured parts or sub-assemblies of manufactured goods that are singulated and oriented by the present invention for packaging or further assembly. The manufactured parts may have irregular shapes. The objects may be plants or parts thereof such as tulip bulbs, pine trees or vines that must be singulated and oriented (root side down) prior to planting. The objects may be bales of material that are singulated and oriented to for example orient fibers in a composite material. The objects may be packages of food products or packages of manufactured goods that are singulated and oriented by the present invention during packaging. The objects may be envelopes, boxes, packages, or shipping containers that are singulated and oriented by the present invention in a postal system or a courier system to track and direct each object to a destination. Similarly the invention may be used in distribution and inventory control systems. The objects may be for example luggage in transport system such as an airport, rail station, bus depot, or port. The types of objects and applications referenced herein are illustrative and do not limit the scope of the invention to the types of objects and applications described herein.

While the duct as described in some examples herein is typically a channel with upstanding sides formed in a disk, the duct can also be circular, oval, triangular or quadrilateral etc. or can be a partial tube that is generally C-shaped, V-shaped or L-shaped. The duct can also be defined by a minimal two- or three-dimensional surface, or surfaces defined by the points of contact imparting force on the objects. The duct can also be an enclosed tube of many different cross-sectional shapes such as circular, oval, triangular or quadrilateral.

The duct may consist of a plurality of pathways wherein each pathway conveys objects with a different set of orientations and there is provided a means to move objects from a first pathway to a second pathway dependent on object orientation. In some embodiments at least one of the pathways within a duct is shaped and arranged to change the orientation of an object entering the pathway. In some embodiments at least one of the pathways within a duct is shaped and arranged to change the orientation of an object within the pathway. In some embodiments at least one of the pathways within a duct is shaped and arranged to change the orientation of an object exiting the pathway. In some embodiments at least one of the pathways contains a means to eject objects to a discard bin based at least in part on a measured parameter. In some embodiments at least one of the pathways contains a means to eject objects to a discard bin based on a dynamical property of the object. In some embodiments at least one of the pathways contains a means to direct objects to a recirculation bin based at least in part on a measured parameter. In some embodiments at least one of the pathways contains a means to direct objects to a recirculation bin based on a dynamical property of the object. In a preferred embodiment, the pathways within a duct are shaped and arranged to cause objects entering the duct with different orientations to exit the duct with the same orientation.

In the present invention, the inertial forces on the object reckoned in a rotating frame of reference are resisted in at least one direction by normal forces provided by the pathway surface and the object is accelerated in response to the remaining net inertial force. The inertial forces generated within the rotating frame of reference depends on the angular velocity and may be much larger than the force of gravity used in prior art systems. Larger forces enable the arrangement of the present invention to singulate and orient objects at a higher rate. The optimal rotation rate depends on the magnitude of surface forces. Generally micron sized objects experience strong surface forces resisting motion and high rotation rates such as 100,000 RPM, for example are appropriate. For meter sized objects, surface forces relative to mass are small and rotation rates such as 100 RPM, for example may provide adequate throughput. Higher rotation rates may be used to increase throughput. Lower rates of rotation may be used to limit impact forces on delicate objects.

The means to move an object from one pathway to another pathway may be dynamic or static. In the static case, the shape of the pathway exerts different normal forces on objects oriented differently for at least one point along the pathway and the different forces cause objects oriented differently to follow different paths. For example, objects in a radial duct section of the present invention are accelerated outward by the centrifugal force and tangentially into a duct wall by the Coriolis force. The duct wall may be stepped tangentially such that an object in a first orientation fits within a first step and an object in a second orientation extends beyond a first step. The object in a first orientation experiences no net force in the tangential direction and no net torque about a radial axis. The object in the second orientation experiences a net torque about a radial axis and possibly a net tangential force (depending on where the object center of mass is positioned relative to the step). The net torque and/or net tangential force on the object in the second orientation cause the said object to follow a different pathway from an object in a first orientation. In another example, the duct wall includes a tangential wedge shaped protrusion positioned such that objects in a first orientation are not engaged by the protrusion and a part of objects in a second orientation engage the protrusion and experience a torque and changes the path of said object in second orientation. The displacement vector of objects in a duct may include a component parallel to the rotation axis by inclining a portion of the duct wall with respect to the axis of rotation. In another example the duct wall may be shaped to permit an object in a first orientation to have displacement parallel to the rotation axis and to prevent an object in a second orientation to have displacement parallel to the rotation axis. The process may be repeated to sort objects with a plurality of different orientations each to paths with different displacements parallel to the rotation axis. In some embodiments, objects are fed into a different buffer for each object orientation. Objects in a first orientation along a pathway may be rotated to a second orientation by placing a protrusion along the pathway such that the protrusion engages so as to produce a torque on the object. In a preferred embodiment, objects in each orientation are rotated to a common orientation prior to placement in a buffer.

The mechanics of dynamic embodiments are similar to the mechanics of the static embodiments discussed above except that a sensor system measures orientation of each object and sends signals to one or more actuators to change the shape of the pathway for each object. For example, a protrusion may be extended from a duct wall when the sensor detects a first object orientation and said protrusion acts as a pivot point causing objects incident on the pivot to rotate 90 degrees about an axis perpendicular to the duct wall. The protrusion is retracted for objects detected to be in a second orientation and no rotation occurs.

In some embodiments, an operation is carried out on singulated and oriented objects during the singulation and orientation process. The operation can be inspection by a sensor means at any location along the object pathway. In some embodiments the inspection is done at a plurality of locations along an object path and the path is shaped to present different surfaces of an object to inspection by one or more sensors at each location. For example, an object pathway may be configured to present each of six sides of a rectangular box to a camera in succession. In some embodiments information from sensors is used to track the location of each object. In some embodiments, sensor information about each object is stored and analyzed. In some embodiments, objects are directed to a different path based at least in part on at least one object parameter measured by a sensor. The operation can be labeling or marking, for example with a laser or with a dye. The labeling or marking operation may, for example place a product code or a lot code or a dale code or information about a measured parameter of the object. The operation can be coating, for example with a preservative, lubricant or adhesive.

BRIEF DESCRIPTION OF THE DRAWINGS

One embodiment of the invention will now be described in conjunction with the accompanying drawings in which:

FIG. 1A is a top view and FIG. 1B is a side view.

FIGS. 8A and 8B show a schematic illustration of an arrangement according to the present invention to singulate and orient objects of different types.

FIGS. 10A and 10B show a schematic illustration of a further apparatus to singulate and orient objects of different types.

FIG. 13 is a schematic illustration of paths 81 and 86 of the arrangement of FIG. 6A which acts to change the orientation of the objects.

DETAILED DESCRIPTION

Figure 1A:
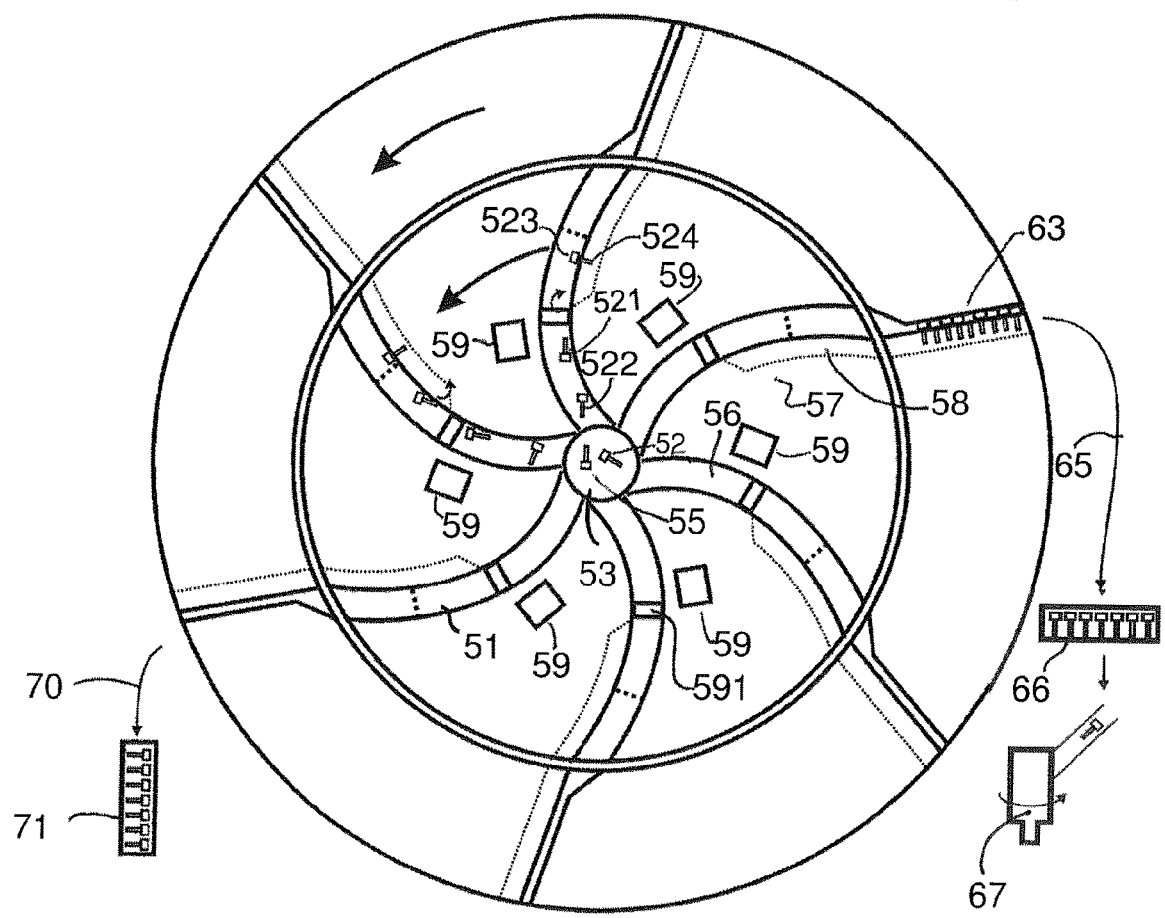
FIGS. 1A and 1B show a schematic illustration of a preferred embodiment the present invention where

As shown in FIG. 1A, a rotating body 50, described in more detail hereinafter, has one or more integral ducts 51 carried on the body 50 at angularly spaced portions there around. Thus, each duct is rotated about an axis at the center of the body. The ducts are fed with objects 52 by supply conduit 53 and act to singulate the objects so that they are fed in a row one behind the other. Supply conduit 53 includes a gate 531 that regulates the flow of objects onto rotating body 50. Objects become aligned with the longitudinal direction along the duct axis either parallel to the duct as indicated at 521 or antiparallel as indicated at 522 as objects move from the inner end of a duct to the outer end.

In the example shown, each object has a longitudinal axis and is shaped so that the object has first and second different orientations of the longitudinal axis. That is in one example applied to screws or similar fasteners, the objects have a head 523 and a shank 524 and the longitudinal axis is longitudinal of the shank so that when the longitudinal axis aligns with the longitudinal direction of the duct, the head can be first or last.

On the device therefore, the objects are formed into a stream of the objects which are singulated each from the next by passing the objects along the singulation duct and rotating the singulation duct about the axis 55 such that centrifugal forces generated by the rotation act to drive the objects along the singulation duct and to cause pressure on the objects against a wall 56 of the singulation duct 51 to slide along the wall 56.

In order to orient the objects so that the longitudinal axis of the object is transverse to the length of the duct, a section of the duct indicated at 57 contains a slot 58 shaped and designed to permit only part of the object such as the shank to enter while the head remains in the duct and cannot enter the slot. As better shown in FIG. 1B, section of duct 57 is movable to direct objects to a first buffer 61 or a second buffer 62.

That is the orienting is effected by an abutment structure, in this example the slot 58, which engages the objects while in the singulation duct and acts to rotate the longitudinal axis about the transverse axis.

The objects experience a torque about the portion of the object that cannot enter the slot due to Coriolis forces and rotate so as to orient the object relative to both the duct and slot. Thus, the heads and the shanks are aligned at right angles to the direction of movement.

Figure 1B:
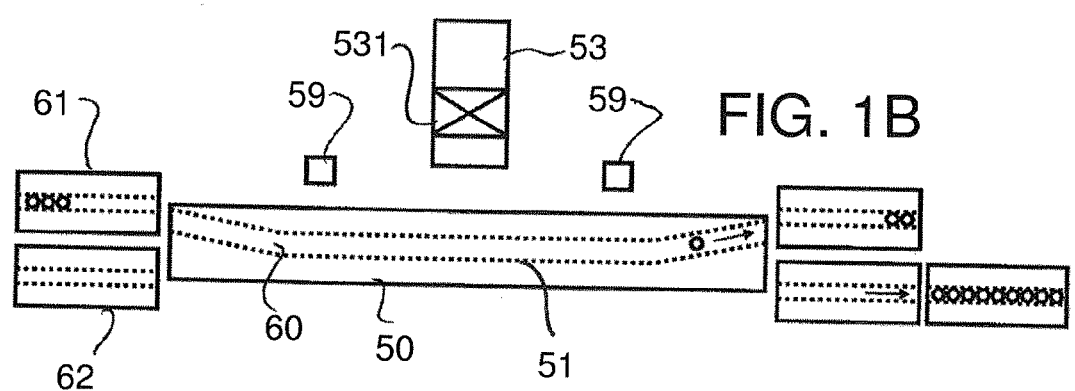

A detector 59 examines passing objects while in the duct and communicates with a diverter 60 at the end of the duct. The diverter 60 operates to direct objects into different paths upwardly or downwardly. The diverter can take different forms. The diverter 60 as shown in FIG. 1B comprises a short duct portion which operates by changing the angle of the duct either upward to buffer 61 or downward to buffer 62. Another form of diverter is shown in FIG. 4, which is the preferred form for ejecting defective objects shown at 591 generally proximate to detector 59. The diverter can direct objects to a buffer 61 rotating synchronously (at the same angular velocity) with the rotating body or to a reject bin (not shown). As can be seen more easily in FIG. 1B, the diverter can direct objects along different paths to buffer A 61 and buffer B 62. Only two buffers are shown for illustrative purposes, but more, preferably three are present. Each buffer has three possible states. Firstly, the buffer can be rotating synchronously with the rotating body and receiving objects for storage in an ordered array. Secondly, the buffer can be undergoing angular acceleration. Thus, the objects are transferred from the singulation duct 56 to a buffer container 63 in which the objects are halted to form a feed supply of the objects. The objects in buffer container 63 may be used by a tool as a side by side array or be discharged shank first into a tube for use by a tool.

The angular acceleration either brings the buffer to rest with respect to a stationary frame of reference or brings the buffer to synchronization with the rotating body. Thirdly, the buffer can be at rest. While at rest, the objects in the buffer can be transferred into another stationary buffer. Referring to FIG. 1B, in objects from duct 56 are directed to buffer A rotating synchronously. Detector 59 counts objects entering buffer A and generates a signal to accelerate buffer B to synchronous motion when a threshold number of objects are stored in buffer A. When the detector count reaches a second threshold count corresponding to buffer A full, the diverter directs objects to buffer B. Note that the object count is understood to represent the number of objects entering the buffer and does not include objects diverted to a reject bin based on a measured parameter. While objects are being diverted to buffer B, buffer A is brought to rest and then emptied. When empty, buffer A is ready to take the place of buffer B to receive objects. Each buffer thus cycles between the three states aforementioned. To provide a continuous supply of objects, at least three buffers are required, one for each state.

As shown in FIG. 1A, six buffers 63 are angularly spaced to line up with duct exits. In an alternative arrangement, a plurality of buffers 63 may be associated with each duct exit by locating buffers at angles intermediate between duct exits. For example, there could instead be four or more buffers arranged at angles between each pair of duct exits. In this alternate embodiment, each time e buffer is full; the ring of buffers rotates to the next empty buffer in the ring. Full buffers in the ring may be transferred individually as described above or a group by replacing the ring with another when all buffers in the ring are full.

Figure 2:
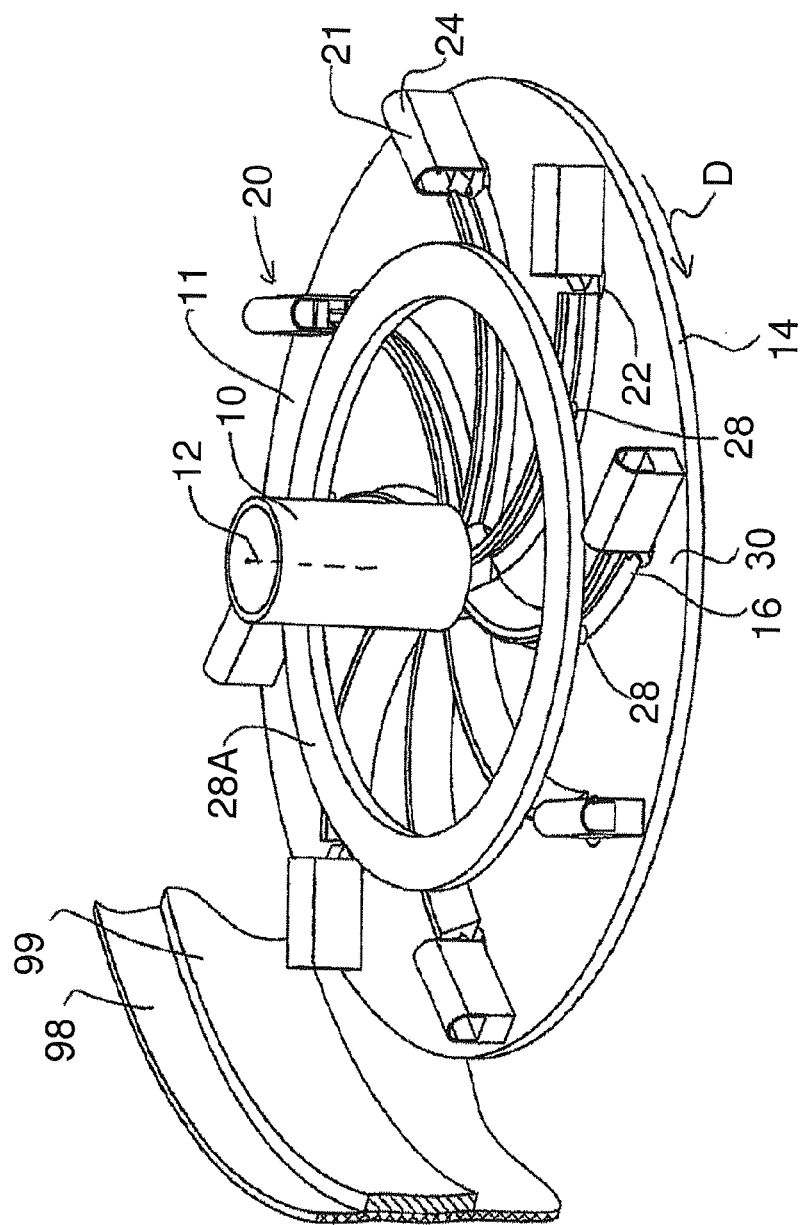
FIG. 2 is an isometric view of a sorting apparatus showing an arrangement for object singulation according to the present invention.
Figure 3:
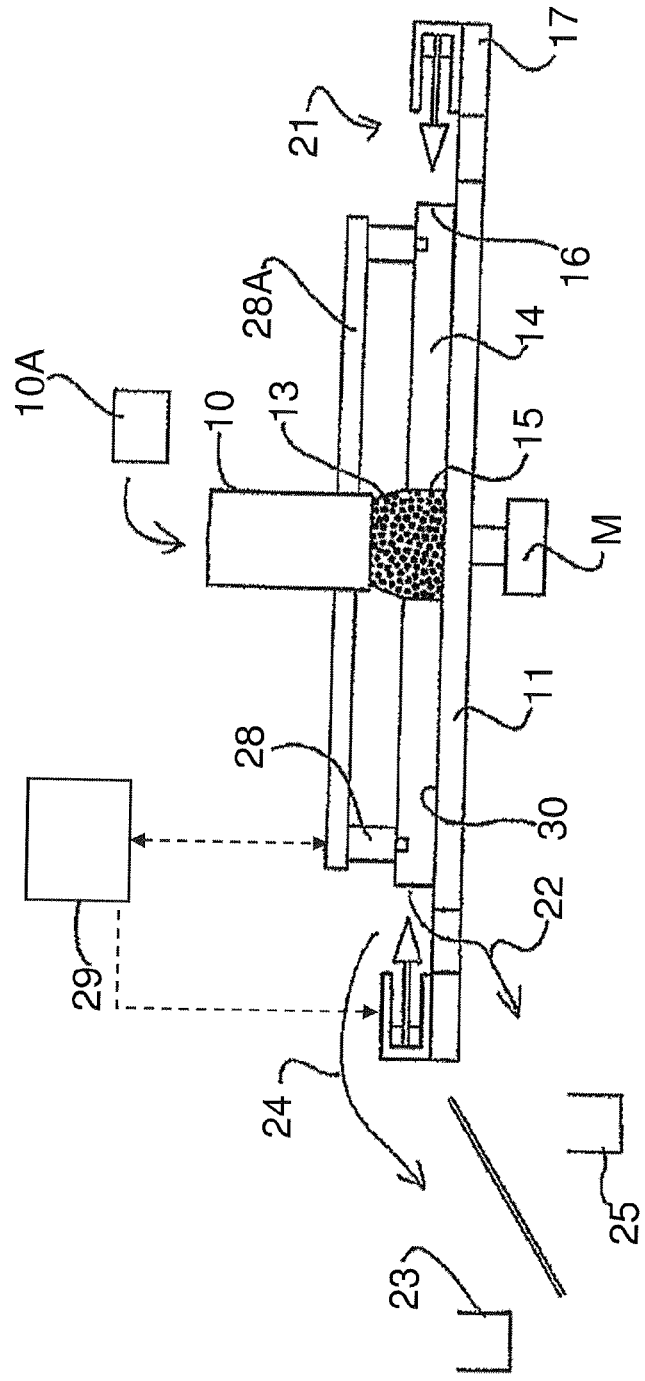
FIG. 3 is a vertical cross-sectional view through the apparatus of FIG. 2.

The apparatus for feeding objects based on a measurable parameter of the objects shown in FIGS. 2 and 3 comprises a supply conduit 10 carrying objects to be singulated and oriented from a feed supply 10A (FIG. 3) which supplies the objects in a continuous stream for presentation through the conduit to a rotary body 11 rotatable around an axis 12. In the embodiment shown the rotary body is a flat disk with the axis 12 arranged vertical so that the disk provides an upper horizontal surface onto which the objects 13 are supplied in the stream from the conduit 10. The conduit is arranged at the centre of the disk so that the objects are deposited onto the centre of the position where the disk is rotating but where there is little outward velocity. The object velocity at this point is from the flow in the supply conduit 10. The velocity at a point on the disk is $v = wr$ where w is the angular velocity and r is the radius. If objects are deposited in a region where the change in velocity is too high, they bounce and the flow is chaotic. Objects are deposited in the central region to minimize the change in velocity.

On the upper surface of the disk forming the rotary body is provided one or more ducts 14 (FIG. 3) each extending from an inner end 15 adjacent the axis outwardly to an outer end 16 spaced at a greater radial distance outwardly from the axis than the inner end. In this embodiment the outer end 16 of the ducts is arranged adjacent to but spaced inwardly from the edge 17 of the disk 11. In this embodiment each duct 14 extends from a position closely adjacent the centre to the periphery 17 of the disk so that the centre of the ducts are arranged immediately side by side and the ducts diverge outwardly so that at the outer end 16 they are spaced around the periphery 17.

The inner ends 15 are thus arranged in an array adjacent to the axis so that the supply conduit 10 acts to deposit the objects to be sorted at the inner ends 15 of the ducts for entry of the objects to be singulated and oriented into the inner ends. As the inner ends are immediately adjacent at the centre of the disk, the objects there form a pile at the centre which is automatically sorted evenly into the open mouths of the ducts at their inner ends. Assuming a continuous pile of the objects at the centre, the rotation of the disk will act to evenly sort the objects into the individual ducts in a stream defined by the dimensions of the mouth relative to the dimensions of the objects. At the outset of the path along the duct, the objects will be immediately adjacent or overlapping. However, passage of the objects along the duct while they are accelerated by the centrifugal forces will act to spread the objects each from the next to form a line of objects with no overlap. As the forces increase with increasing radial distance from the axis 12, the objects will be increasingly accelerated and thus the distance between objects will increase along the length of the duct. The objects align with the duct axially in the first part of the duct and the object length defines an initial center to center spacing with some variation due to differences in object orientation. The centrifugal acceleration is uniform at a given radius. The frictional forces scale with the Coriolis force=uN (u=coefficient of friction, N=normal force to duct wall supplied primarily by the Coriolis force). As set out above, the duct can be shaped to minimize the normal force and friction by curving the duct along the line of net force (mentioned in text earlier). Conversely, the object acceleration can be reduced by curving the duct to increase normal forces, curving the duct to constant or even decreasing radius, or increasing the coefficient of friction of a selected portion of a duct by changing the texture and/or material.

The singulated objects may be totally separated each from the next defining a space, may be immediately behind one another or may even be slightly overlapped.

Thus, the ducts are shaped and arranged so that the objects are accelerated as they pass from the inner end to the outer end so as to cause the objects to be aligned one after the other in a row as they move toward the outer end.

The outer ends 16 are arranged in an angularly spaced array at an outer periphery of the rotary body so that the objects of the row of objects in each duct are released by centrifugal force from the disk outwardly from the axis of the disk. The openings all lie in a common radial plane of the disk. The ducts can be formed either as grooves cut into the upper surface of a thicker disk or by additional walls applied on to the top surface of the disk, or two-dimensional and/or three-dimensional shaped guides.

An array 20 of object separating devices 21 is arranged in an annulus at the outer edge 17 of the disk so that the individual separating devices 21 are arranged at angularly spaced positions around the disk.

Figure 4A:
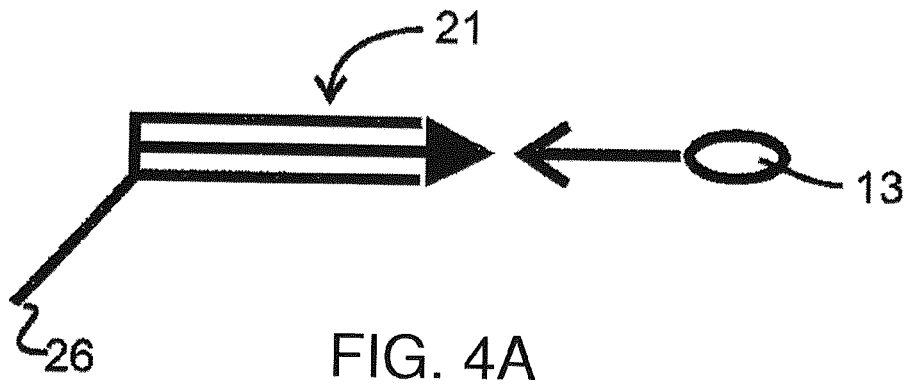
FIGS. 4A, 4B and 4C show vertical cross-sectional views through the separating device of the apparatus of FIGS. 2 and 3.
Figure 4B:
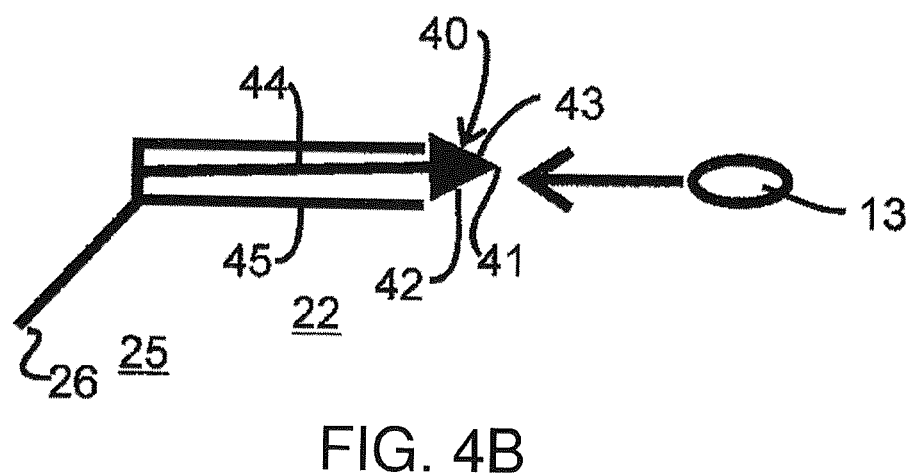
Figure 4C:
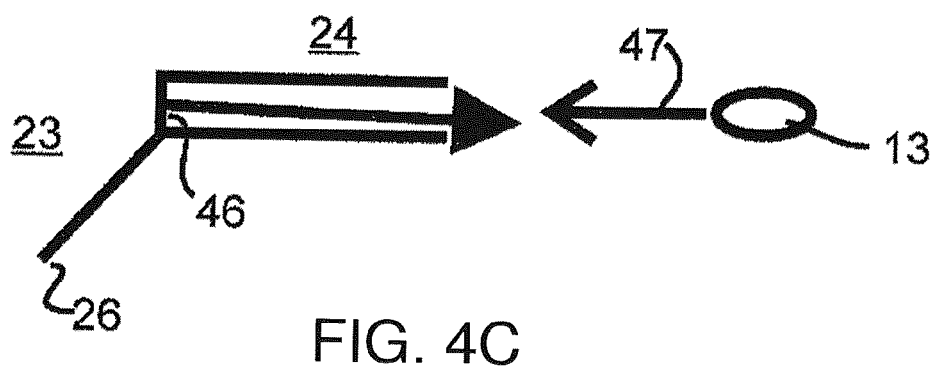

Each separating device is operable to direct each object into one of a plurality of paths as determined by operation of the separating devices. In the example shown the separating devices are arranged to direct the objects upwardly or downwardly relative to the plane of the outlets 16. As shown in FIG. 2 and FIG. 4A the separating device 21 can take up an initial intermediate or stalling position where the objects are not separated to one direction or the other. As shown in FIG. 4B, the separating device can be moved upwardly so as to direct the objects downwardly into a path 22 for collection within a collecting chamber 25. Similarly, when the separating device is moved to a lowered position as shown in FIG. 4C, the objects are moved upwardly over the top of the separating device along a path 24 for collection within a chamber 23. Chambers 23 and 25 may be a reject bin, a section of duct, a packaging operation, a marking operation or a buffer. The two paths 22 and 24 are separated by a guide plate 26 which ensures that the objects move to one or other of the chambers 23, 25. The guide plate 26 and the walls of the chambers 23, 25 may be covered with a soft material to reduce impact forces on objects. Objects may be slowed by air flow or a curtain of compliant material on entry to containers 23, 25.

In order to control the separating devices 21, there is provided a measuring system generally indicated at 28 which is used to measure a selected parameter or parameters of the objects as those objects move from the end of the duct at the edge of the disk toward the separating devices. The measuring devices are carried on a mounting ring 28A.

The measuring system can be of any suitable type known in this industry for example optical measuring systems which detect certain optical characteristics of the objects to determine the particular parameters required to be measured. Other measuring systems can also be used since the type of system to be used and the parameters to be selected are not part of the present invention.

Each separating device 21 is associated with a respective detecting device 28, which may include multiple detecting components, operable to measure the parameter of the objects and in response to the parameters measured by the associated detecting device, the respective or separating device is operated to select the path 22 or the path 24.

It will be appreciated that the number of paths can be modified to include more than two paths if required depending upon the parameters to be measured. Such selection to an increased number of paths can be carried out by providing subsequent separating devices 21 positioned downstream of the initial separation. In this way one or both of the paths can be divided into two or more subsidiary paths with all of the separating devices being controlled by a control system 29 receiving the data from the measuring device is 28.

The disk 11 thus has a front face 30 facing the supply conduit and the ducts 14 lie in a radial plane of the disk and extend outwardly from the axis to a periphery 17 of the disk 11.

As shown in FIG. 2, the ducts 14 are curved so that the outer end 16 is angularly retarded relative to the inner end 15. This forms a side surface of each duct which is angularly retarded relative to the direction of rotation in the clockwise direction as shown at D. This curvature of the ducts is arranged to follow substantially the Coriolis and centrifugal forces so that the objects follow along the duct without excessive pressure against either side wall of the duct. However, the shape of the duct is arranged so that the Coriolis forces tend to drive the object against the downstream side of the duct 14.

As shown best in FIG. 2, the ducts 14 are immediately side by side at the inner ends 15 adjacent the axis and increase in spacing toward the outer ends 16. At the inner ends 15 the ducts are immediately side by side so that the maximum number of ducts is provided by dividing 2*pi by the angle subtended by the width of the duct ends at the opening 15. The number of ducts can be increased, in an arrangement not shown, where the ducts include branches so that each duct divides along its length into one or more branches.

In the embodiment of FIGS. 2 and 3, the detection device 28 and the separating device 21 are both located within the periphery 17 of the disk. In this way the objects are guided as they pass from the outer end of the ducts to the array of separating devices. As shown in FIG. 2, a wall 98 may be used to halt the outward motion of objects. The wall 98 may for example be located at the end of a buffer. Preferably the wall 98 has a layer of soft compliant material 99 such as rubber to cushion the impact of objects and reduce probability of damage to the objects.

As best shown in the FIGS. 4A, 4B and 4C, each separating device comprises a separating head 40 having a front edge 41 lying generally in a radial plane of the disk 11 so that objects released from the outer ends 16 move toward the front edge 41. The separating head 49 includes the inclined guide surfaces 42 and 43 on respective sides of the front edge 41. In this way the separating head 40 is generally wedge shaped. The separating head is mounted on a lever 44 mounted inside a tube 45 so that the lever and the actuating mechanism for the lever are protected inside the tube which is located behind and protected by the separator head. An actuator 46 is provided for moving the front edge 41 between first and second positions above and below the radial plane 47 defined by the path of the object 13. Thus, in FIG. 4A a central and neutral position is shown. In FIG. 4B the front edge 41 has moved upwardly which is arranged to direct the object to a side of the radial plane below the radial plane. In the position shown in FIG. 4C, the front edge is moved downwardly to a second side of the radial plane and is arranged to direct the object to the first or upper side of the radial plane. This movement of the wedge shaped head and its front edge requires little movement of the front edge 41 and uses the momentum of the object itself to cause the separation simply by the object sliding over the guide surfaces 42 and 43. The separation head therefore does not need to move into impact with the object or to generate transverse forces on the object since the head merely needs to move into position allowing the object to generate the required separation forces.

In view of the provision of the lever, the actuator 46 is required to generate only small distance movements and hence can be moved by piezo electric members. Alternatively, the movements can be carried out by a small electromagnetic coil. This design allows the use of components which can generate the necessary high-speed action to take up the two positions of FIGS. 4B and 4C sufficiently quickly to accommodate high-speed movement of the objects. As shown the actuator 46 is located outward of the separating head and lies in a radial plane of the separating head.

The arrangement of the present invention therefore provides a system for singulation and orientation of the objects, for example screws, where the objects are supplied in a feed zone and are separated by the ducts and the inlet of the ducts so as to form a plurality of streams of the objects.

As best shown in FIG. 1, the object buffering device 63 provides a supply of the objects which are transferred as shown at 65 to a transfer member 66 for transferring the singulated oriented objects from the object buffering device 63 to an operating tool 67 such as a screw driver.

As an alternative to the driver 67, the objects from the buffer 63 can be supplied as indicated at 70 to an operating device 71 such as a marker to apply an action to the oriented objects so that the action takes place on each object in the same orientation.

Figure 5:
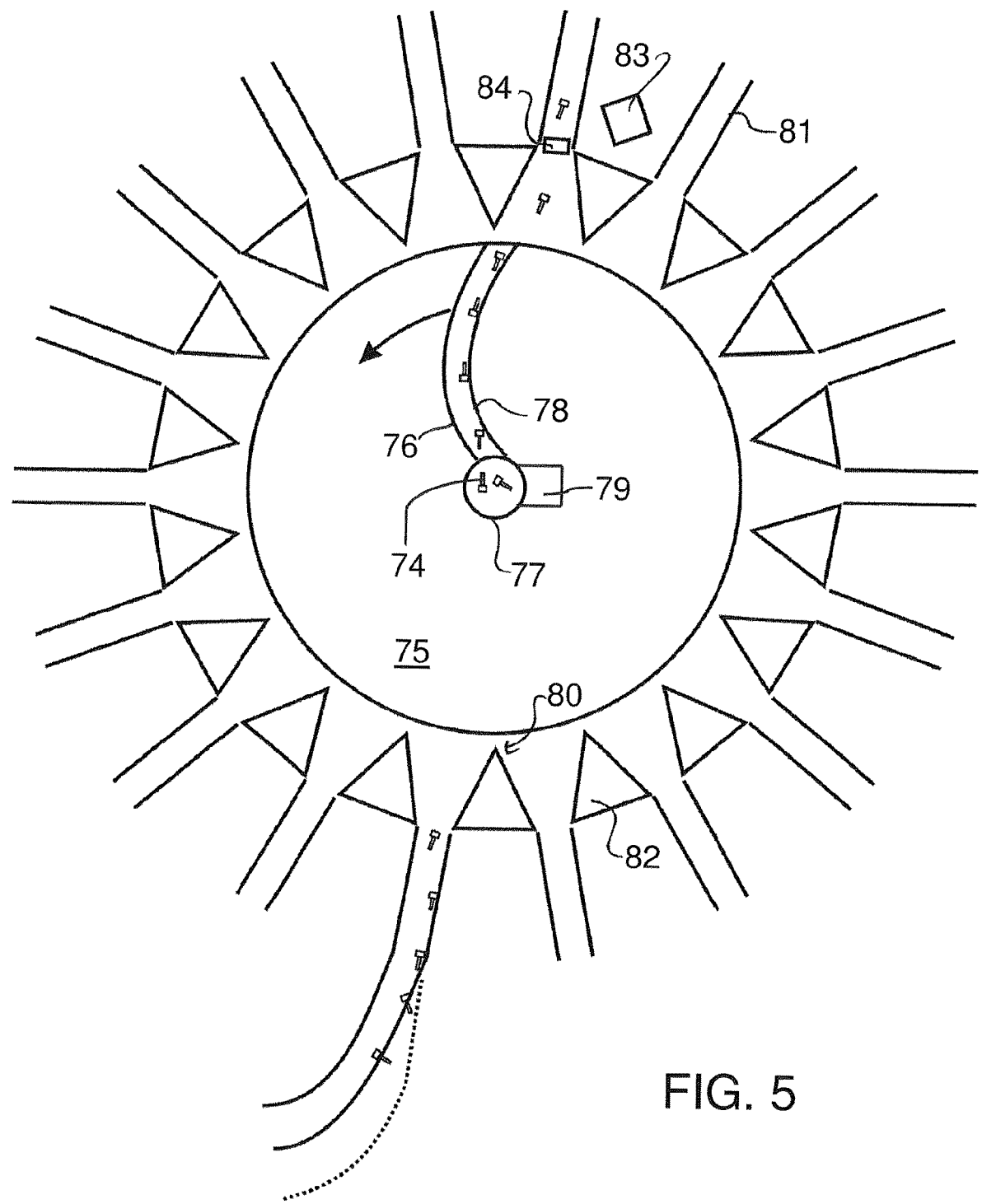
FIG. 5 is a schematic illustration of an alternative singulation and orientation arrangement according to the present invention.

As shown in FIG. 5, there is shown an alternative arrangement wherein the orienting is located beyond an end of the singulation duct rather than in the duct itself.

In this arrangement there is a rotating body 75 onto which objects 74 are deposited in the central region by a feed conduit 77.

In this arrangement, the feed conduit 77 can include an agitating device 79 so that the supply duct is agitated to ensure the objects enter the singulation duct or ducts and do not lock up due to friction or interlocking.

The objects move along the duct 76 integral to the rotating body 75 from the inner opening to the outer opening under the influence of centrifugal force. Objects are aligned against a duct wall 78 by Coriolis force. Objects exiting the duct traverse an air gap 80 and are directed into a stationary duct 81, which constitutes the object buffer in this embodiment, by a series of wedges 82 and the orientation of each object is measured by a detector 83. Objects determined to be within a desired orientation range continue into the stationary duct 81, objects otherwise oriented are rejected (and possibly re-introduced to feed duct 77) by diverter 84. In a related form (not shown), a diverter 84 directs objects with different orientations into different buffers. For example, a first buffer could be a tube filled end to end with objects oriented with an orientation vector parallel to the tube axis and a second buffer could be filled end to end with objects oriented antiparallel to the tube axis. After filling, both tubes are removed and the second tube is rotated 180 degrees to bring the orientation of all objects in the second tube into alignment with objects in the first tube.

The stationary duct preferably has a cross section slightly larger than the object so that the walls of the stationary duct tend to preserve the object orientation. The stationary duct is preferably curved such that objects entering come up against a duct wall on one side of the duct. The duct wall aligns the object longitudinally. In some embodiments the objects are buffered and used end to end. In some embodiments, the duct wall includes an abutting structure such as a slot for object alignment. Objects entering the stationary duct will tend to collide with the walls of the stationary duct at grazing angles and lose momentum ultimately coming to rest. The object may optionally be conveyed further by a difference in air pressure between the entrance and exit of the stationary duct.

Figure 6A:
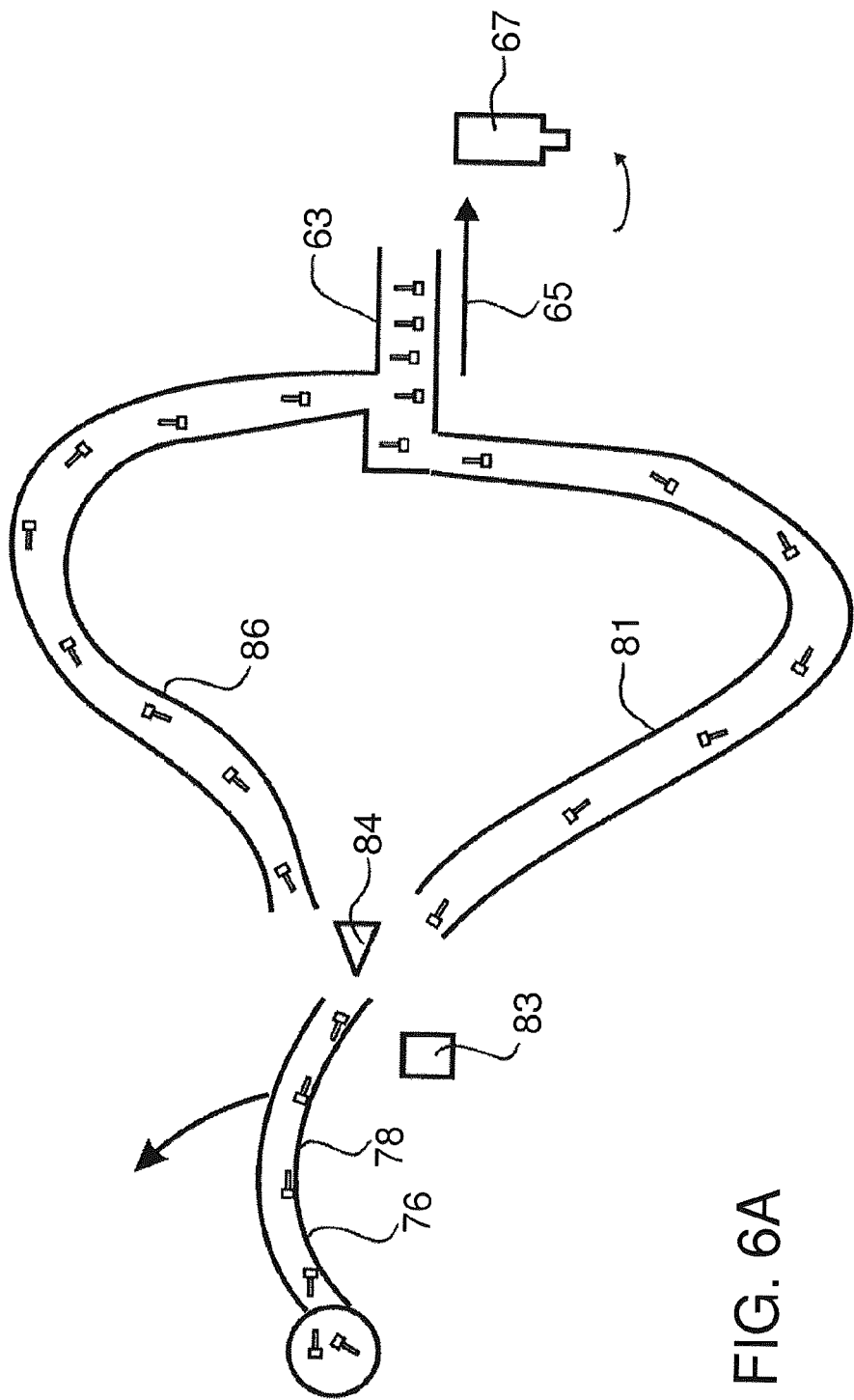
FIGS. 6A, 6B and 6C show schematic illustrations of another arrangement according to the present invention for orienting objects.
Figure 6B:
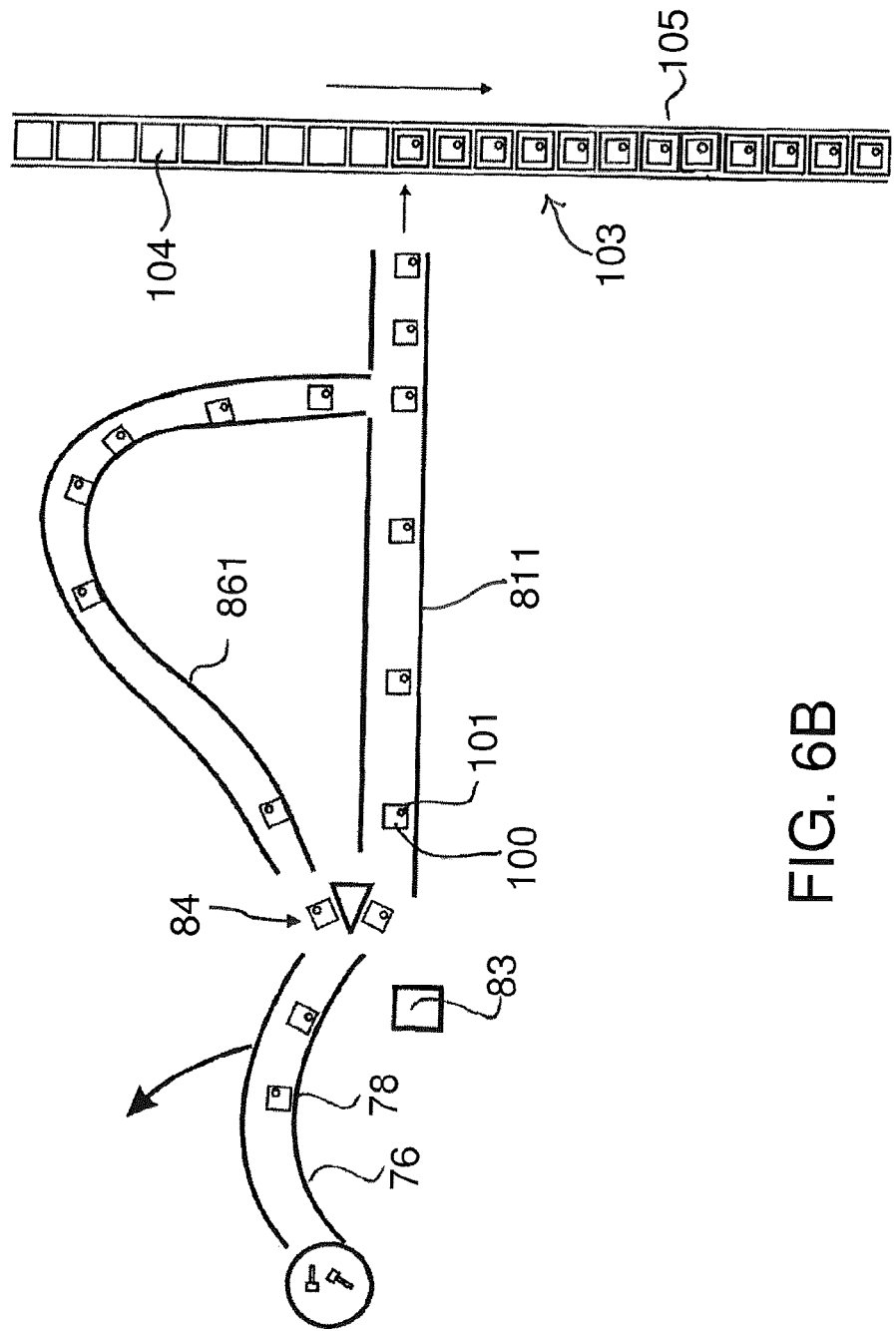
Figure 6C:
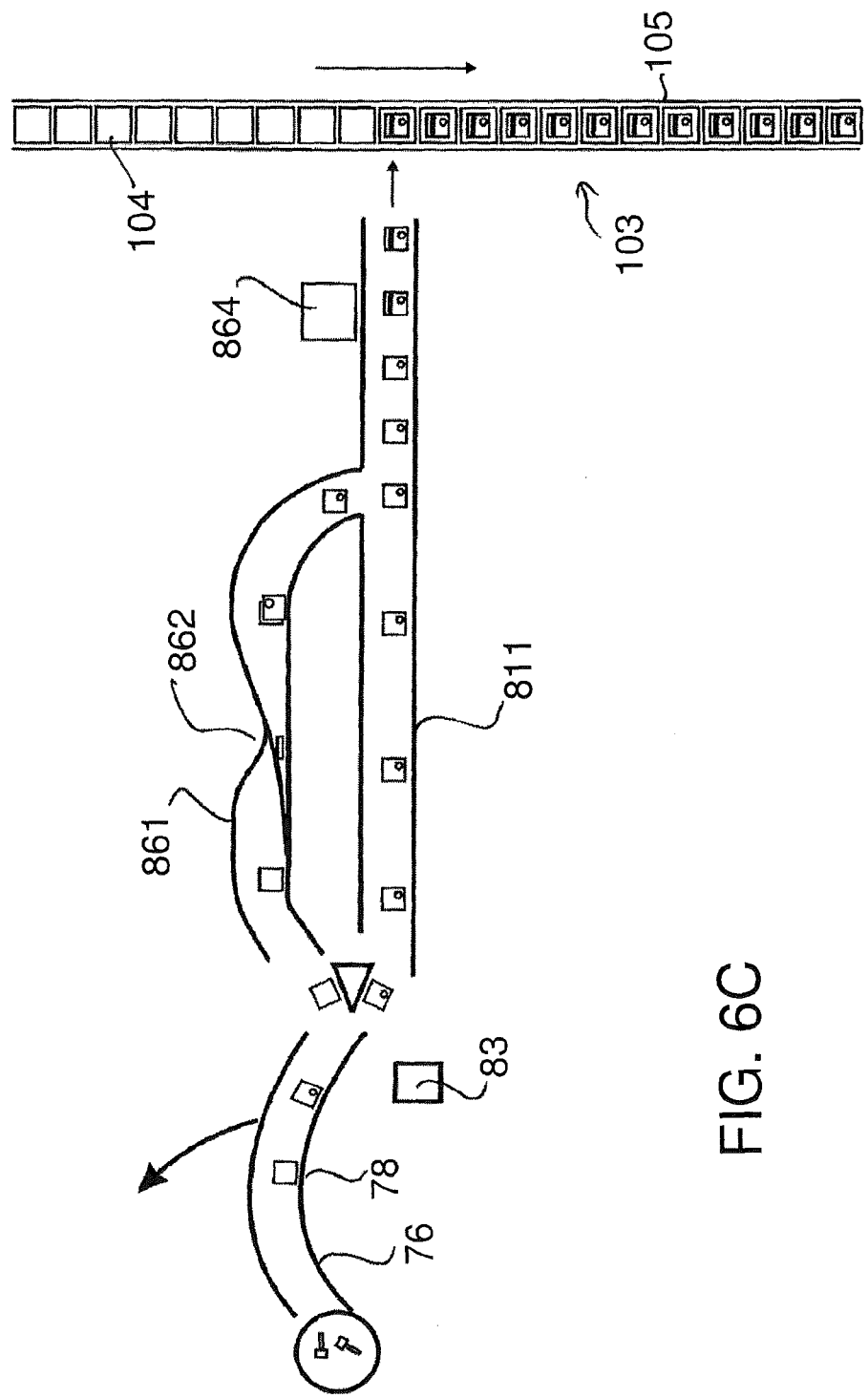

FIGS. 6A to 6C illustrate alternative methods to bring a stream of objects with different orientations to a common orientation in an object buffer. In FIG. 6A, a stream of objects moving from left to right under the influence of centrifugal force and is singulated. The objects are initially oriented parallel and antiparallel to the duct wall by Coriolis force. The orientation of each object is determined by the detector proximate to the stream which communicates with a diverter. If the object is a desired orientation, the object continues along a first path. Otherwise the object is diverted into another path by a diverter 84. In one arrangement (not shown) the path operates to engage the objects which are not correctly oriented and they are returned to the supply conduit.

The arrangement shown in FIG. 6A is a $\pi$ radians object rotator about an axis orthogonal to the longitudinal axis that can be used separately or in combination with preceding or following orientation methods. In this arrangement, the diverter 84 operates to direct objects oriented antiparallel follow path 81 and objects oriented parallel to follow path 86. Path 86 feeds objects into a buffer from the top. Path 81 feeds objects into a buffer from the bottom. Objects entering the buffer are propelled to the right. The buffer is shaped to preserve the orientation of objects entering along path 81 and path 86. Because objects enter from opposite directions with opposite orientation, objects in the buffer have the same orientation as shown.

Thus, the objects are operated upon to change the orientation thereof depending on the detected orientation and the objects are directed along first and second paths 81, 86 depending on the detection of the first and second orientations. The first path 81 is arranged to change the orientation of the objects therein relative to the second path so that the objects are combined into a common stream 63 from the first and second paths in the same orientation.

The arrangement shown in FIG. 6B is a $\pi/2$ radians object rotator about an axis orthogonal to the longitudinal axis that can be used separately or in combination with preceding or following orientation methods. The case shown in this arrangement is a surface mount integrated circuit chip 100 with 4-fold rotational symmetry. The dot 101 conventionally represents the position of pin 1 and can be in any one of eight positions following singulation: four orientations facing toward the singulation duct wall and four orientations facing away from the singulation duct wall. Detector 83 determines the object orientation. The diverter 84 operates to direct objects with pin 1 in the upper right and lower right corners into paths 811 and 861 respectively. Path 861 feeds objects into a buffer from the top. Path 811 feeds objects into a buffer directly. Objects entering the buffer are propelled to the right. The buffer is shaped to preserve the orientation of objects entering along paths. Because objects enter from orthogonal directions, objects in the buffer have the same orientation as shown. It should be appreciated that $\pi/2$ and $-\pi/2$ radians object rotations are mirror images of one another in the arrangement shown in FIG. 6B. Oriented objects in the buffer are fed to a packaging operation generally indicated at 103. Objects are placed into pockets 104 on a tape 105. The path lengths or travel time along the two paths 811 and 861 is arranged to be the same so that an object extracted onto the path 861 is inverted and returned into the path 811 at the same location that it was removed. All of the paths 76, 811 and 861 can be mounted on a common rotating body or the paths 861 and 811 may be held stationary while the path 76 rotates to provide the singulating action.

The arrangement shown in FIG. 6C is a π radians object rotator about a longitudinal axis that can be used separately or in combination with preceding or following orientation methods. Objects oriented facing away from the singulation wall are diverted into path 811 and travel directly to a buffer. Objects oriented facing the singulation wall are diverted to path 861 which has a π radians twist 862. The duct walls of path 861 are shaped to constrain objects to follow the path axis. Hence, a π radians twist in the path 861 at 862 flips the orientation of the object by π radians and then deposits the object in a buffer. Oriented objects in the buffer might for example, pass a marking operation 864 where the marked objects are then directed to a packaging operation 103 in which the objects are placed in pockets 104 on a tape 105.

Although FIGS. 6A to 6C show orthogonal object rotations, it should be appreciated that other angles of rotation are possible and that the rotations can be applied sequentially in any order to achieve a desired object orientation.

Figure 7:
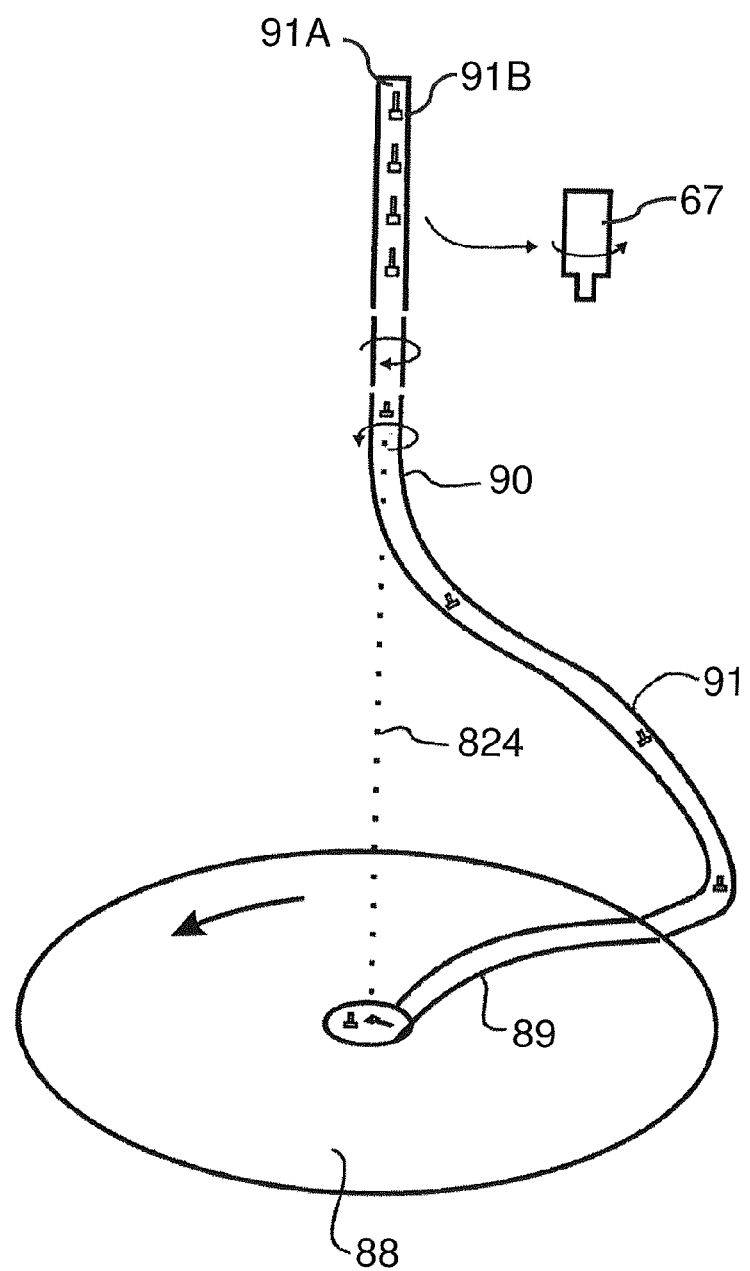
FIG. 7 is a further schematic illustration of an apparatus for directing the flow of singulated and oriented objects where the objects are delivered in an axial direction of an axis of rotation of the singulation system.

FIG. 7 illustrates a method to convert a radial stream of singulated and oriented objects in the duct 89 carried on the body 88 rotating around axis 824 into an axial stream of singulated and oriented objects flowing along an exit duct 90. Objects are deposited in the central region of a rotating body and enter a duct as shown in more detail in FIGS. 1 to 3. The objects are oriented in a region near the periphery of the rotating body by methods better shown in FIGS. 1, 6A, 6B and 6C in region termed the alignment zone. Objects exiting the alignment zone enter a duct labeled path 91 which curves radially inward toward the axis 824 becoming axial at the terminal end 90. Centrifugal force and friction resist the motion of objects along path 91, so it is necessary to provide a motive force in the direction of path 91. The motive force can be supplied by a pressure gradient generated by applying vacuum to the terminal end 91A of path 91 at outlet 90. Other methods may be used such as air pressure delivered to path 91 at some point (not shown) along the direction of travel of the objects. Path 91 can also, for example, take the form of a moving belt with receptacles to receive objects (not shown).

It should be noted that the arrangement shown can induce a spin in the object at the terminal end. An optional end section 91B linked with a rotating joint can be made to rotate in the opposite direction to reduce object spin.

Thus the objects are fed from the singulation duct 89 to a supply duct 91 having an end portion 90 lying on the axis of rotation of the singulation duct such that the objects are supplied at the end portion 90 in a stream with the same orientation (by including, for example the arrangement in FIG. 6A within path 91) for feeding to a tool or driver 67. The arrangement shown can produce an axial stream of objects in any orientation because gravity is small compared with the inertial forces generated in the singulation duct.

FIGS. 8A and 8B show arrangements suitable for singulating and orienting different types of objects. FIG. 8A shows a rotating body 901 with two ducts 911 end 912. Duct 911 is fed with objects through supply conduit 921 connected with a bulk supply (not shown) of a first object type. Duct 912 is fed with objects through supply conduit 922 connected with a bulk supply (not shown) of a second object type. The concentric supply conduits stationary and are not attached to rotating body 901. In some embodiments, a duct 911 is enclosed as indicated at 914 to constrain the object orientation. Hence with the arrangement in FIG. 8A singulated streams of two different types of objects can be supplied at the same time through ducts 911 and 912. FIG. 8B shows an alternative arrangement wherein supply conduits 921, 922, and 923 feed objects from the side into the central regions of rotating bodies 901, 902, and 903, respectively. The supply conduits may be flexible hoses or rigid pipes. The supply conduits are stationary and not attached to the rotary bodies. The rotating bodies 901, 902 and 903 contain ducts 911, 912 and 913 respectively. The rotating bodies may rotate at different rates so as to supply different types of objects to a downstream operation in the quantities required. Alternately, rotary bodies 901, 902 and 903 may rotate synchronously as a single body.

Figure 9A:
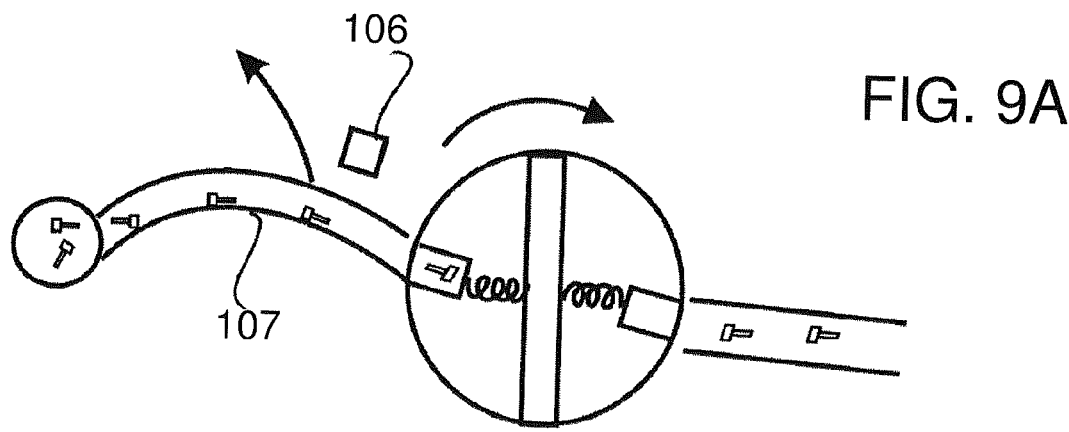
FIGS. 9A, 9B and 9C show three positions of a further schematic illustration of an arrangement according to the present invention to singulate and orient objects of different types.
Figure 9B:
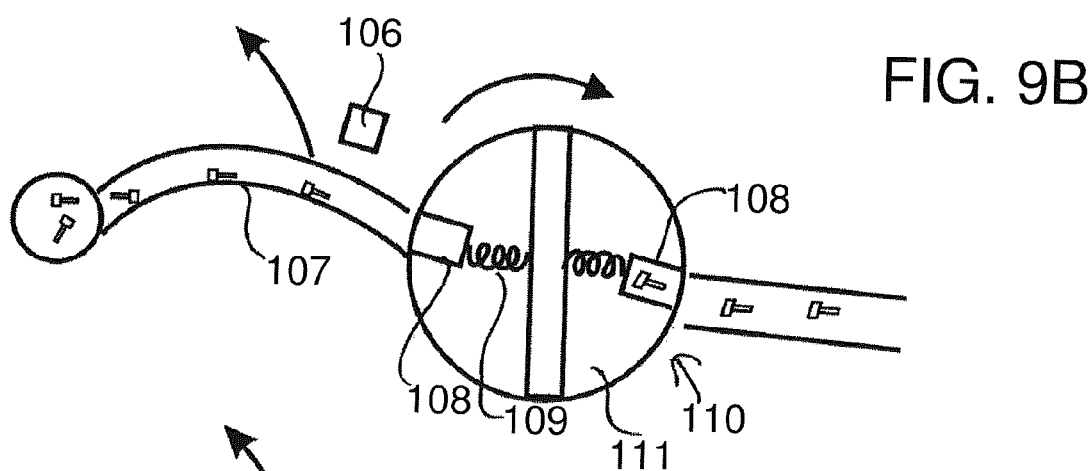
Figure 9C:
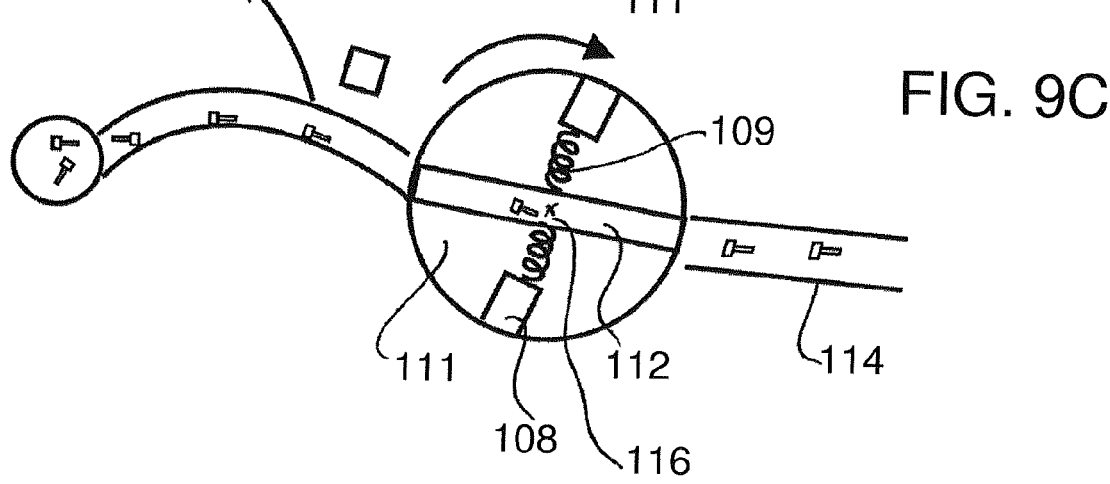

FIGS. 9A to 9C show a series of steps of another method for changing object orientation and placing objects into a buffer end to end. A detector 106 determines the object orientation in singulation duct 107. Objects aligned antiparallel enters a slot 108 in a rotating body 111. Preferably the slot 108 contains a spring 109 that compresses storing the kinetic energy of the object. As the spring is being compressed, the rotating body rotates and the slot 108 moves to a release position 110 shown in FIG. 9B. Stored energy in the spring 109 then ejects the object with reversed orientation and substantially the same kinetic energy as it entered with. It should be noted that the spring 109 may be mechanical or electromagnetic. Preferably the rotating body 111 has the slots on opposing faces to limit the range of angular motion required to catch a second object. For objects aligned parallel to the singulation duct axis, the rotating body rotates to provide path 112 for the object to pass straight through to a buffer.

When the detector determines the object is in a first orientation, the second rotary body 111 is rotated to a first position to align the duct 112 through the rotary body with the object path 107 and the object passes through unimpeded retaining first orientation into a supply duct or buffer 114. Supply duct 114 is a tube cartridge. When the detector determines the object is in a second orientation, the second rotary body is rotated to a second position to align a depression in the rotary body with the object path. The object enters the depression and acts against a spring so as to transfer the kinetic energy of the object into potential energy in the spring.

The second rotary body 111 rotates to a release position where the object is released with a different orientation. In some cases, the second rotary body has a casement (not shown) that retains the object during rotation to the release position. At the release position, potential energy stored in the spring is transferred to kinetic energy of the object. The arrangement shown provides an axis 116 of rotation of the body 111 which is a significant distance from the object itself. In some cases, the axis 116 may be at the center of mass of the object or within the object so as to reduce the energy required to move between the positions of FIGS. 9A and 9B.

The spring 109 can also be provided by an electromagnetic spring. For objects that have a net electrical charge or a net charge separation (dipole), an electric field is optionally applied to retain the spring in a fixed position, or even to increase the energy stored in the spring to a pre-determined level. The second rotary body then rotates to a release position and the electric field is switched off or reversed. The potential energy in the spring is transferred to the object and the object is ejected from the depression with a different orientation. The kinetic energy of the object may be further increased at the release position by reversing the electric field.

FIGS. 10A and 10B show a two-step process wherein objects are singulated by a duct 120 on a rotating body 121 and released in all directions around the periphery. Objects are caught by a funnel structure 123 preferably made of compliant material to reduce the object's kinetic energy.

In FIG. 10A, the funnel directs objects to release duct 124 where detector 125 measures object presence generating a signal causing a second rotary body 126 to rotate to align orientation duct 127 with the release duct so as to capture object 128. The orientation duct 127 is shaped to guide the object toward an abutting slot 130. The rotary body and integral orientation duct are then rotated about axis 131 generating inertial forces that cause a part of the object to enter the abutting slot and orient the longitudinal axis of the object normal to the duct wall in the same manner as described with reference to FIG. 1A. Radial motion of the object due to centrifugal forces is prevented by a casing around the second rotary body (not shown). Aligned objects are released into a buffer 132 at release position 133. The buffer supplies singulated and oriented objects to tool 134.

In FIG. 10B, the funnel constrains the orientation of objects to states with longitudinal axis parallel and antiparallel to the funnel axis. Detector 125 measures the object orientation and generates a signal causing diverter 135 to direct objects oriented antiparallel to buffer 137 and objects oriented parallel to an alignment wheel 136 with pockets 138 that retain the parallel orientation. The wheel then rotates by a distance of one pocket position so as to present an empty pocket for the next parallel oriented object. An outer casing retains the objects in pockets between the capture position 139 and release position 140. Once the pockets between the capture and release positions are filled, each increment of the wheel captures one object and releases one object into a direction angularly displaced from the capture position. Thus as shown, the objects are captured in a parallel orientation and released on a path 141 to buffer 137 in a substantially antiparallel orientation. Objects are fed from buffer 137 to tool 134.

Figure 11A:
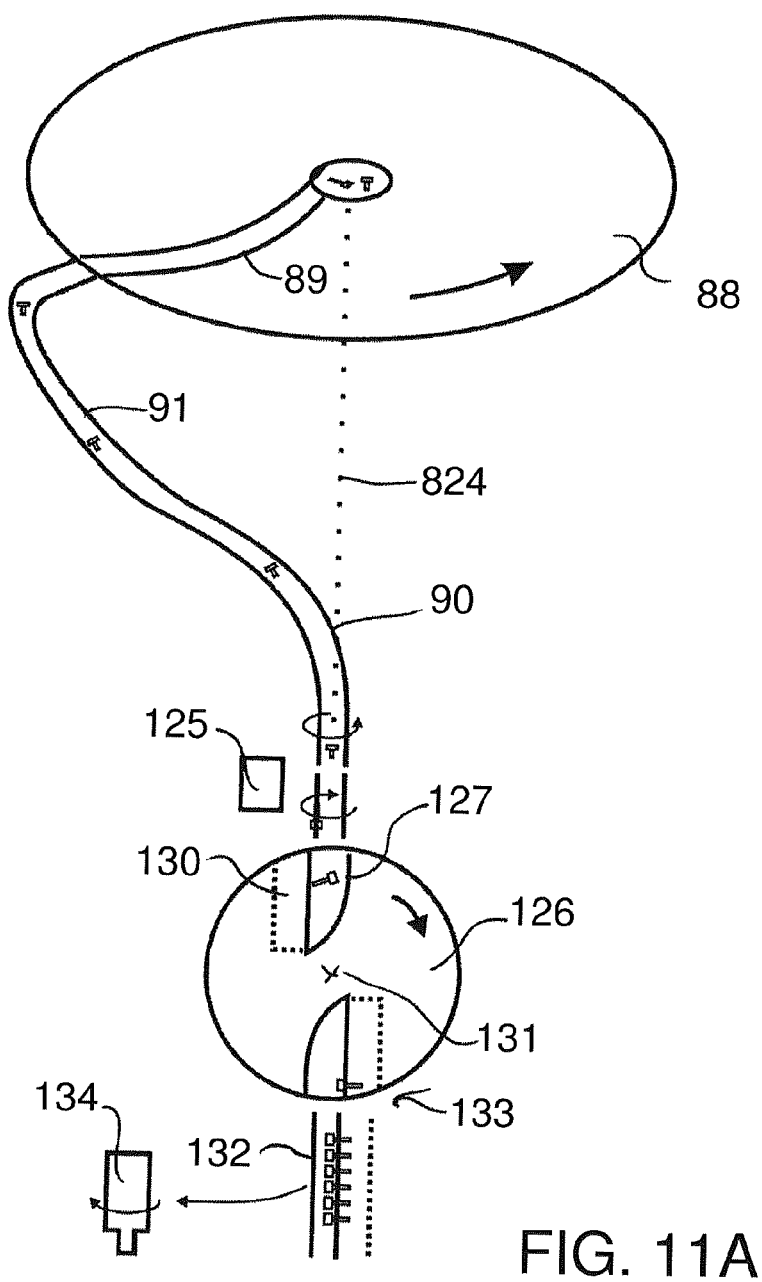
FIGS. 11A and 11B show a schematic illustration of a further apparatus to singulate and orient objects of different types.
Figure 11B:
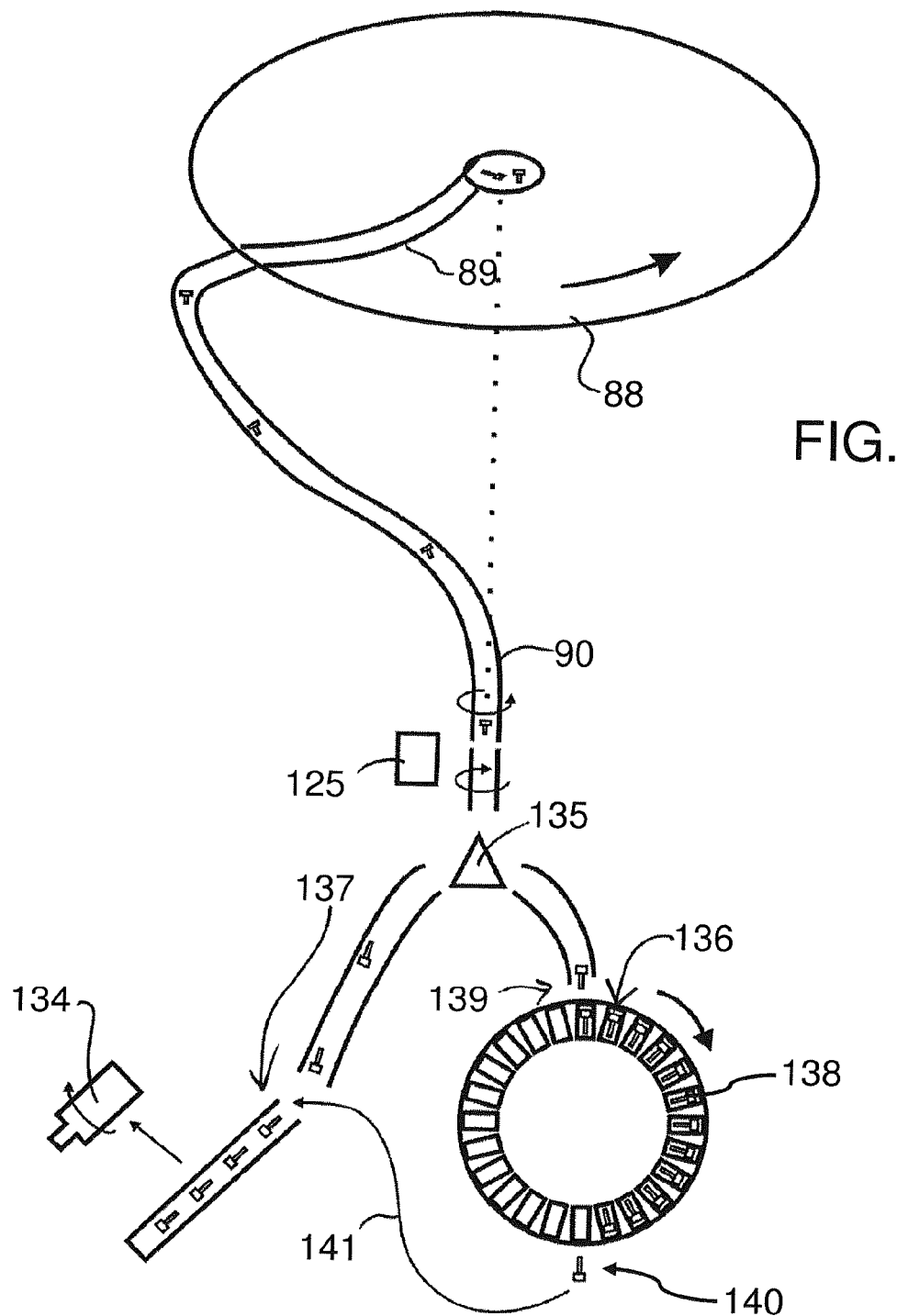

The constructions of FIGS. 11A and 11B are very similar to the constructions of FIGS. 10A and 10B and use the same orienting systems as shown in those embodiments. Like the embodiment shown in FIG. 7, objects are deposited in the central region of a rotating body 88 and enter a duct 89 as shown in more detail in FIGS. 1 to 3. Objects are singulated in the duct 89 carried on the body 88 rotating around axis 824. In the embodiment of FIG. 7, objects are brought to a common orientation on the rotating body whereas in the embodiments of FIGS. 11A and 11B objects are brought to a common orientation after exiting an axial port 90. Specifically, objects with a longitudinal axis enter the axial port 90 with either parallel or antiparallel orientation with respect to the axis of rotation.

In FIG. 11A, the axial pod directs objects to supply duct 91 where detector 125 measures the object presence generating a signal causing a second rotary body 126 to rotate to align orientation duct 127 with the supply duct 91 so as to capture object 128. The orientation duct 127 is shaped to guide the object toward an abutting slot 130. The rotary body and integral orientation duct are then rotated about axis 131 generating inertial forces that cause a part of the object to enter the abutting slot and orient the longitudinal axis of the object normal to the duct wall in the same manner as described with reference to FIG. 1A. Radial motion of the object due to centrifugal forces is prevented by a casing around the second rotary body (not shown). Aligned objects are released into a buffer 132 at release 133.

In FIG. 11B, the detector 125 measures the object orientation proximate to axial port 90 and generates a signal causing diverter 135 to direct objects oriented antiparallel to buffer 137 and objects oriented parallel to an alignment wheel 136 with pockets shaped to capture objects at position 139 and retain the parallel orientation. The wheel then rotates one pocket position presenting an empty pocket for the next parallel oriented object. An outer casing retains the objects in pockets between the capture position 139 and release position 140. Once the pockets between the capture and release positions are filled, each increment of the wheel captures one object and releases one object into a direction angularly displaced from the capture position. Thus as shown, the objects are captured in a parallel orientation and released to buffer 137 in a substantially antiparallel orientation by transfer means 141. Objects are fed from buffer 137 to tool 134.

In addition to the slot arrangement 58 (FIG. 1A) described above for orienting the objects within the duct, which can be either the singulation duct or in a downstream separate duct, many other arrangements for changing the orientation are possible. In one arrangement (not shown) the object may be oriented by simple friction between the object and the wall over which it is travelling, provided sufficient space is provided within the duct for the object to turn. In this arrangement, where the object has areas of greater and lesser friction, friction causes the area of the object which has the most frictional effect with the wall to be located at a position where that area is trailing and the area of lesser frictional effect is leading.

Other arrangements can use a rebounding effect described below. Many other surface arrangements can be designed which engage the object and can rotate it about a certain axis to obtain change in orientation. It will also be appreciated that some objects have many different axes about which the orientation can be changed and the arrangements described herein can be used repeatedly to re-orient the object about all of the axes to obtain a selected one of eight different orientations.

Figure 12:
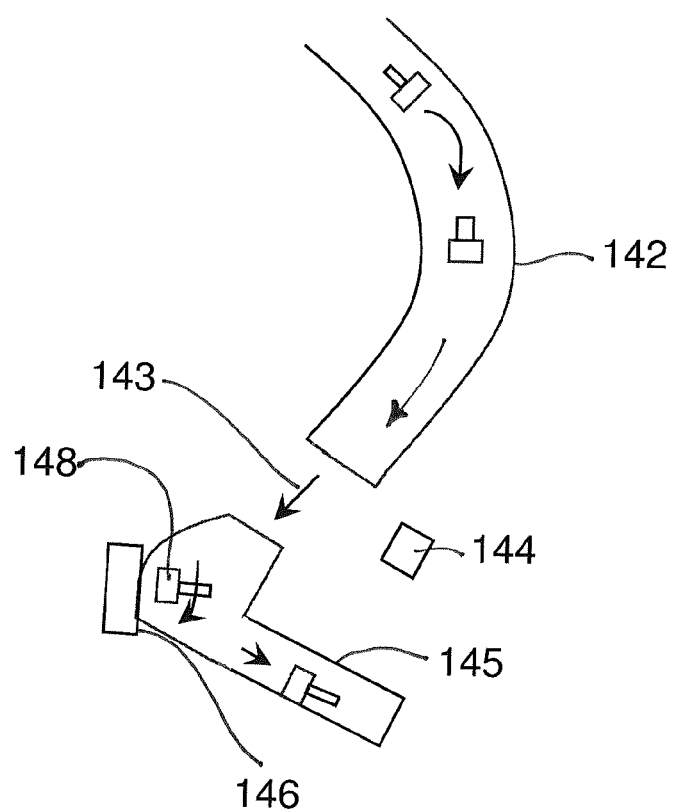
FIG. 12 is a schematic illustration of one path 86 of the arrangement ire of FIG. 6A which acts to change the orientation of the objects.

Turning now to FIG. 12, there is shown another arrangement similar to that of FIGS. 6A, 6B and 6C where the orientation of the object is determined by the sensor 83 and directed by the deflector 84 into one of two separate paths. In one of the paths the orientation is maintained and in the other of the paths the orientation is reversed. In FIG. 12, the second path is shown at 142 and the orientation is changed by introducing the object 148 into a path 145 which includes a rebound device 146. The object passes through an air gap 143 at which a detector 144 is located to sense the character or orientation of the object. The rebound device is arranged to impact the object at a required location so that its bounce causes it to change orientation. Thus, as shown if the head impacts the rebound device first, the object is reversed in direction in the path 145 so that the shank or tail is first. The rebound device 146 can be moved or actuated to change the direction of rebound to different paths depending on data from the sensor 144.

In FIG. 13 is shown another arrangement similar to that of FIG. 6. In this arrangement the deflector 84 is replaced by a rebound deflector 821 which is movable between two different positions depending on the detection of the orientation of the object by the sensor 83. In one position where the orientation is determined to be a required orientation, the defector 821 moves away from the path and allows the object to pass from the path 76 onto the path 81 while maintaining the same orientation. In the second position the rebound deflector impacts the object which is determined to be of the opposite orientation and impacts the object in a manner which causes the object to enter the path 86 while at the same time reversing the orientation in the rebound.

Figure 14A:
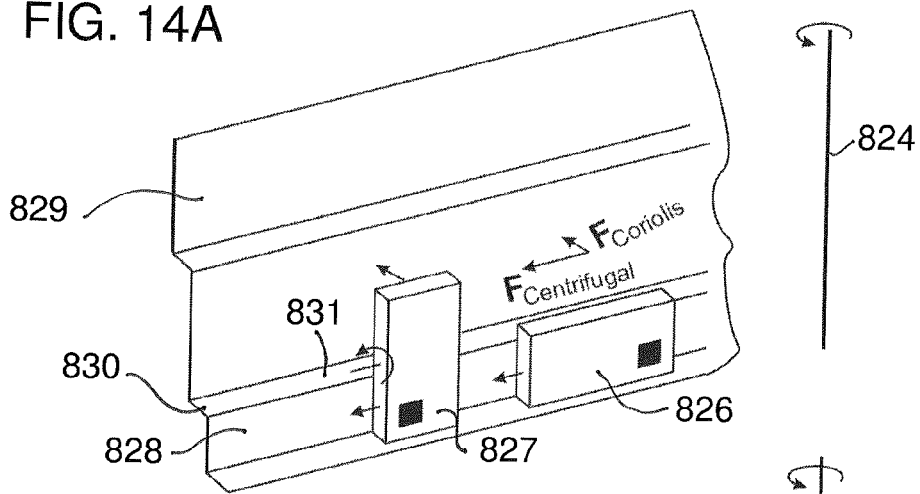
FIG. 14A is a schematic illustration of sorting objects by orientation with a tangential step.

FIG. 14A shows a radial section of duct 825 rotating about axis 824 generating centrifugal and Coriolis inertial forces along the duct and into the duct wall respectively, as indicated. The duct geometry as shown is for simplicity of illustration only. The duct wall may in general may be curved having both radial and tangential components. Objects 826 and 827 are moving along pathway 828 accelerated by centrifugal force which tends to increase the spacing between objects. Object 826 in a first orientation is stable along pathway 828 as a normal force from the duct wall on pathway 828 counters the Coriolis force into the duct wall. Object 827 in a second orientation is unstable along pathway 828 and tends toward pathway 829 due to a tangential step in the duct wall 830. Object 827 experiences a torque about axis 831 toward pathway 829. Hence objects with different orientation are sorted vertically in the direction of the duct rotation axis onto different pathways by the arrangement shown in FIG. 14A.

Figure 14B:
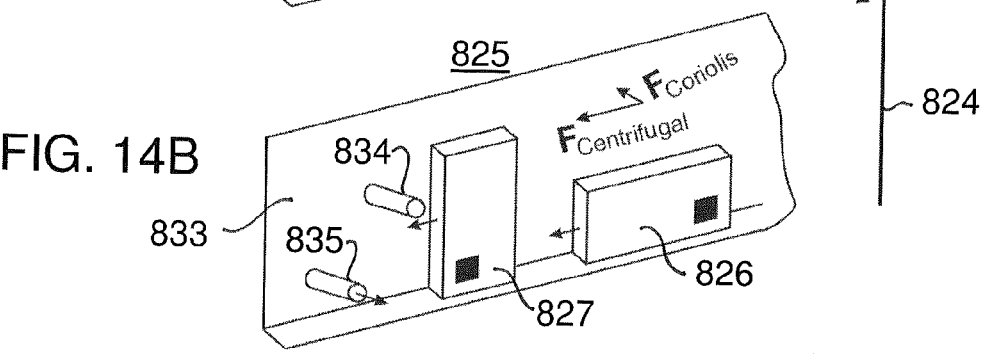
FIG. 14B is a schematic illustration of rotating objects in a plane with a protrusion.

FIG. 14B shows another arrangement suited for changing the orientation of objects moving along pathway 833. In one arrangement a protrusion 834 is positioned to engage objects with the orientation of object 827 and generate a torque to rotate object by 90 degrees. Object 826 passes under protrusion 834 and retains the same orientation. In a second arrangement a detector (not shown) measures the orientation of each object and depending upon the measured orientation a control system actuates protrusion 835 to engage and rotate selected objects from a first orientation to a second orientation.

Figure 14C:
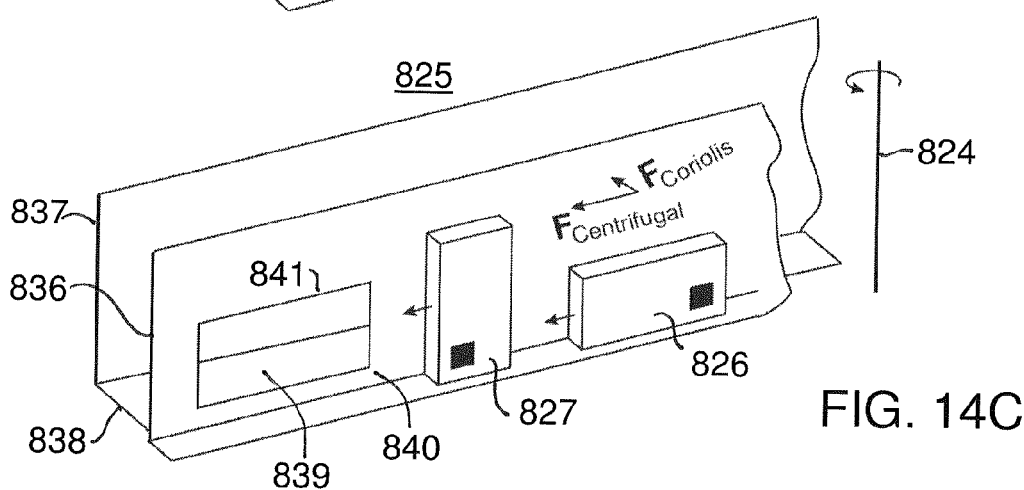
FIG. 14C is a schematic illustration of sorting objects by orientation tangentially with a slot.

FIG. 14C shows an arrangement for sorting objects tangentially depending upon object orientation. Objects 826 and 827 are accelerated along pathway 836 by centrifugal force and are held against the duct wall of pathway 836 by Coriolis force. Object 827 encounters slot 839 and is supported above and below slot 839 by sections of duct wall indicated at 840 and 841. In some embodiments slot 839 may be opened and closed by an actuator in response to a sensor measurement of object orientation. Hence object 826 continues along pathway 836. Object 826 encounters slot 839 and is supported only by the strip of duct wall indicated at 840. Hence object 826 is pulled through slot 839 by Coriolis force and crosses into the gap between pathways 838 and proceeds along pathway 837. Hence objects with different orientation are sorted tangentially by the arrangement shown in FIG. 14C.

The arrangements shown in FIGS. 14A, 14B and 14C may be used in any combination with each other and in any combination with arrangements discussed above within the scope of the present invention.

The invention claimed is:

1. A method for feeding objects in a stream from a massed supply of the objects where each object has an orientation axis and is shaped so that the object has first and second different orientations of the orientation axis, the method comprising:
supplying the massed supply of the objects;
transferring the objects from the supply into a singulation duct;
forming the objects into a stream of the objects which are singulated each from the next by passing the objects along the singulation duct and rotating the singulation duct about a rotation axis such that centrifugal forces generated by the rotation act to drive the objects along the singulation duct and such that the centrifugal forces generated by the rotation act to press the objects against a wall of the singulation duct to slide along the wall;
and orienting the objects in the stream by engaging the objects in the stream and rotating at least some of the objects in the stream so that, at a location in the stream, the objects at the location are all oriented in an orientation in which the orientation axis is transverse to a direction of movement of the objects along the singulation duct.

2. The method according to claim 1 including applying an action to the oriented objects at the location so that the action takes place on each object while in said orientation.

3. The method according to claim 1 wherein the objects are oriented while the objects are in the singulation duct.

4. The method according to claim 3 wherein the objects are oriented by an abutment structure which engages the objects while in the singulation duct.

5. The method according to claim 1 wherein the objects have a head and a shank and the orientation axis is longitudinal of the shank.

6. The method according to claim 5 wherein there is provided a slot in the singulation duct into which the shank falls while the head remains in the singulation duct to orient the object with the longitudinal axis transverse to the singulation duct.

7. The method according to claim 1 wherein the objects are oriented at said location which is beyond an end of the singulation duct and wherein the objects are oriented by capture as they are released from the singulation duct.

8. A method for feeding objects in a stream from a massed supply of the objects where each object has an orientation axis and is shaped so that the object has first and second different orientations of the orientation axis, the method comprising:
supplying the massed supply of the objects;
transferring the objects from the supply into a singulation duct;
forming the objects into a stream of the objects which are singulated each from the next by passing the objects along the singulation duct and rotating the singulation duct about a rotation axis such that centrifugal forces generated by the rotation act to drive the objects along the singulation duct and such that the centrifugal forces generated by the rotation act to press the objects against a wall of the simulation duct to slide along the wall;
and orienting the objects in the stream by engaging the objects in the stream and rotating at least some of the objects in the stream into an orientation;
forming a buffer containing a plurality of the objects after said singulation and in said orientation;
halting the objects in the buffer to form a feed supply of the objects; and
transferring the singulated and oriented objects from the buffer to an operating location.

9. The method according to claim 8 wherein the buffer rotates with the singulation duct and is subsequently halted to download the objects.

10. The method according to claim 8 including loading the buffer from the singulation duct while a second buffer is halted and subsequently transferring the objects from the buffer while the second buffer is loaded from the singulation duct.

11. A method for feeding objects in a stream from a massed supply of the objects where each object has an orientation axis and is shaped so that the object has first and second different orientations of the orientation axis, the method comprising:
supplying the massed supply of the objects;
transferring the objects from the supply into a simulation duct;
forming the objects into a stream of the objects which are simulated each from the next by passing the objects along the singulation duct and rotating the simulation duct about a rotation axis such that centrifugal forces generated by the rotation act to drive the objects along the simulation duct and such that the centrifugal forces generated by the rotation act to press the objects against a wall of the simulation duct to slide along the wall;
and orienting the objects in the stream by engaging the objects in the stream and rotating at least some of the objects in the stream into an orientation;
wherein there is provided a sensor for detecting characteristics of the objects in the stream.

12. The method according to claim 11 wherein the sensor detects the orientation of the objects in the stream and the objects are operated upon to change the orientation thereof depending on the detected orientation.

13. A method for feeding objects in a stream from a massed supply of the objects where each object has an orientation axis and is shaped so that the object has first and second different orientations of the orientation axis, the method comprising:
supplying the massed supply of the objects;
transferring the objects from the supply into a simulation duct;
forming the objects into a stream of the objects which are singulated each from the next by passing the objects along the singulation duct and rotating the singulation duct about a rotation axis such that centrifugal forces generated by the rotation act to drive the objects along the singulation duct and such that the centrifugal forces generated by the rotation act to press the objects against a wall of the singulation duct to slide along the wall;
and orienting the objects in the stream by engaging the objects in the stream and rotating at least some of the objects in the stream into an orientation;
wherein there is provided a rotary body mounted for rotation around an axis with the rotary body defining at least one duct extending from an inner end adjacent the axis outwardly to an outer end spaced at a greater radial distance outwardly from the axis than the inner end, wherein the massed objects are fed at the inner end of said at least one duct, the inner end being arranged in an array adjacent the axis so that the supply conduit acts to deposit the objects at the inner end of said at least one duct for entry of the objects into the inner end of said at least one duct and for separation of the stream of particles in the conduit into separate ones of said at least one duct, said at least one duct being shaped and arranged so that the objects are accelerated as they pass from the inner end to the outer end so as to cause the objects separated into said at least one duct to be aligned one after another in a row in the duct as they move toward the outer end.

14. A method for feeding objects in a stream from a massed supply of the objects, the method comprising:
supplying the massed supply of the objects;
forming the objects into a stream of the objects which are singulated each from the next;
the objects each having one of first and second orientations where the second orientation is reversed relative to the first orientation;
wherein there is provided a sensor for detecting the first and second orientations of the objects in the stream;
wherein the objects are directed along first and second paths depending on the detection of the first and second orientations;
reversing the orientation of the objects in the second path from the second orientation to the first orientation; and
combining the objects into a common stream from the first and second paths so that all the objects when combined are in the same first orientation.

15. The method according to claim 14 wherein the first path is arranged to feed the objects into the common stream in a first direction and the second path is arranged to feed the objects into the common stream in a second direction opposite to the first direction.

16. The method according to claim 14 wherein the second path includes a twist for reversing the orientation of the objects therein.

17. The method according to claim 14 wherein the second path includes a movable component operable to carry the objects into a reversed orientation for reversing the orientation of the objects therein.

* * * * *